(12) United States Patent
Ren et al.

(10) Patent No.: US 11,465,508 B2
(45) Date of Patent: Oct. 11, 2022

(54) BRAKING RECOVERY SYSTEM AND METHOD FOR TRAIN, AND TRAIN

(71) Applicant: BYD COMPANY LIMITED, Shenzhen (CN)

(72) Inventors: Lin Ren, Shenzhen (CN); Daolin Li, Shenzhen (CN); Wengang Luo, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 840 days.

(21) Appl. No.: 16/335,400

(22) PCT Filed: Feb. 28, 2017

(86) PCT No.: PCT/CN2017/075175
§ 371 (c)(1),
(2) Date: Mar. 21, 2019

(87) PCT Pub. No.: WO2018/054007
PCT Pub. Date: Mar. 29, 2018

(65) Prior Publication Data
US 2019/0291584 A1    Sep. 26, 2019

(30) Foreign Application Priority Data
Sep. 21, 2016    (CN) .......................... 201610839860.3

(51) Int. Cl.
*H02J 7/00* (2006.01)
*B60L 7/10* (2006.01)
*B60M 1/13* (2006.01)
(Continued)

(52) U.S. Cl.
CPC ................. *B60L 7/10* (2013.01); *B60M 1/13* (2013.01); *B60M 3/06* (2013.01); *B61C 3/02* (2013.01);
(Continued)

(58) Field of Classification Search
USPC .......................... 320/130, 132, 134, 135, 136
See application file for complete search history.

(56) References Cited

U.S. PATENT DOCUMENTS

2015/0045907 A1    2/2015  Sambusseti

FOREIGN PATENT DOCUMENTS

CN        102133894 A      7/2011
CN        102358191 A      2/2012
(Continued)

OTHER PUBLICATIONS

The World Intellectual Property Organization (WIPO) International Search Report for PCT/CN2017/075175 dated Jun. 27, 2017 8 Pages.

*Primary Examiner* — Brian Ngo
(74) *Attorney, Agent, or Firm* — Anova Law Group, PLLC

(57) ABSTRACT

This disclosure discloses a braking-recovery system and method for a train, and a train. The system includes: a traction network, a train, and an energy storage power station. The energy storage power station is connected to the traction network, the energy storage power station includes a second controller, and the second controller controls the energy storage power station according to the voltage of the traction network to perform charging or discharging. The train includes: an electric brake; a battery; a distributor, connected to the electric brake, where there is a node between the distributor and the electric brake; a bidirectional DC/DC converter, where one end of the bidirectional DC/DC converter is connected to the battery, and another end of the bidirectional DC/DC converter is connected to the node; and a first controller, used to control, when the train is braked, the distributor and the bidirectional DC/DC converter to feed back braking electric energy of the train to the traction network, and control the bidirectional DC/DC con-
(Continued)

verter according to a voltage of the traction network to absorb the braking electric energy of the train by using the battery.

20 Claims, 14 Drawing Sheets

(51) Int. Cl.
*B60M 3/06* (2006.01)
*B61C 3/02* (2006.01)
*B61C 17/00* (2006.01)
*H02J 7/14* (2006.01)
*H02J 3/28* (2006.01)

(52) U.S. Cl.
CPC ............... *B61C 17/00* (2013.01); *H02J 3/28* (2013.01); *H02J 7/1423* (2013.01); *B60L 2200/26* (2013.01); *B60L 2210/10* (2013.01); *H02J 7/143* (2020.01); *Y02T 10/72* (2013.01); *Y02T 30/00* (2013.01)

(56) References Cited

FOREIGN PATENT DOCUMENTS

| | | | |
|---|---|---|---|
| CN | 102487220 A | | 6/2012 |
| CN | 103311950 A | | 9/2013 |
| CN | 103427430 A | * | 12/2013 |
| CN | 103434420 A | | 12/2013 |
| CN | 103840477 A | | 6/2014 |
| CN | 103879433 A | * | 6/2014 |
| CN | 204687864 U | | 10/2015 |
| CN | 105216638 A | * | 1/2016 |
| CN | 105365585 A | * | 3/2016 |
| CN | 105398353 A | | 3/2016 |
| CN | 206141340 U | * | 5/2017 |
| CN | 206202001 U | | 5/2017 |
| CN | 206202001 U | * | 5/2017 |
| CN | 107128211 A | * | 9/2017 |
| JP | 2003134604 A | | 5/2003 |

* cited by examiner ial Application No. PCT/CN2017/
BRAKING RECOVERY SYSTEM AND METHOD FOR TRAIN, AND TRAIN

CROSS-REFERENCE TO RELATED APPLICATIONS

This application is a national phase entry under 35 U.S.C. § 371 of International Application No. PCT/CN2017/075175, filed on Feb. 28, 2017, which claims Chinese Patent Application No. 201610839860.3, filed on Sep. 21, 2016, content of all of which is incorporated herein by reference in its entirety.

FIELD

This application relates to the field of rail transport technologies and, in particular, to a braking-recovery system for a train, a train having the system, and a braking-recovery method for a train.

BACKGROUND

With continuous expansion of city scales and increasingly jam of transport, a rail train such as a light rail or a subway has become a main transport manner in many cities currently. When a train is being braked, a large quantity of braking electric energy is generated. With continuous deepening of a green environmental protection idea, an issue of recovering and reusing the braking electric energy of the train has been quite urgent. Currently, the related art has disclosed that, a battery is disposed in a train to recover braking electric energy and supply power to the train. However, braking electric energy generated when the train is braked is quite large, and if the braking electric energy is to be absorbed by using an in-vehicle battery, a large quantity of batteries need to be mounted onto the train, which severely increases the weight of the train, affects energy consumption of the train during running, and further increases unnecessary costs.

SUMMARY

An objective of this disclosure is to at least resolve one of the technical problems in the related art to some extent. To this end, an objective of this disclosure is to provide a braking-recovery system for a train, and the system can recover and reuse braking electric energy.

Another objective of this disclosure is to provide a train. Still another objective of this disclosure is to provide a braking-recovery method for a train.

To achieve the foregoing objectives, a braking-recovery system for a train provided in this disclosure includes: a traction network, a train, and an energy storage power station. The train includes: an electric brake; a battery; a distributor, where the distributor is connected to the electric brake, and there is a node between the distributor and the electric brake; a bidirectional DC/DC converter, where one end of the bidirectional DC/DC converter is connected to the battery, and another end of the bidirectional DC/DC converter is connected to the node; and a first controller, where the first controller is connected to the distributor and the bidirectional DC/DC converter, and the first controller is used to control, when the train is braked, the distributor and the bidirectional DC/DC converter to feed back braking electric energy of the train to the traction network, and control the bidirectional DC/DC converter according to a voltage of the traction network to absorb the braking electric energy of the train by using the battery. The energy storage power station is connected to the traction network, the energy storage power station includes a second controller, and the second controller is used to control the energy storage power station according to the voltage of the traction network to perform charging or discharging.

According to the braking-recovery system for a train provided in this disclosure, when the train is braked, the first controller controls the distributor and the bidirectional DC/DC converter to feed back the braking electric energy to the traction network, and controls the bidirectional DC/DC converter according to the voltage of the traction network to absorb the braking electric energy of the train by using the battery. When the voltage of the traction network continues to be increased, the energy storage power station is reused to absorb the braking electric energy. Moreover, the energy storage power station may further discharge to the traction network according to the voltage of the traction network, thereby preventing the voltage of the traction network from being excessively low, to maintain normal operating of the traction network. In this embodiment of this disclosure, when the train is braked, the braking electric energy is first fed back to the traction network. In this case, if there are a relatively large quantity of trains on the traction network, the fed-back braking electric energy is evened to other trains, and therefore the voltage of the traction network is not increased greatly. On the contrary, if there are a relatively small quantity of trains on the traction network in this case, or a relatively large quantity of trains are braked in this case, the voltage of the traction network is increased. In this embodiment of this disclosure, the in-vehicle battery is preferentially used to absorb the braking electric energy, and if the voltage of the traction network continues to be increased after the in-vehicle battery absorbs the braking electric energy, the energy storage power station is then used to absorb the braking electric energy. Because the in-vehicle battery is mounted onto the train, the battery is preferentially used to absorb the braking electric energy, to avoid a problem that the braking electric energy is excessively large and cannot be rapidly absorbed or consumed and consequently an electric appliance of the traction network is burned. In this embodiment of this disclosure, the battery on the train and the energy storage power station are used to absorb the braking electric energy, thereby recovering and reusing the braking electric energy, reducing energy waste, and reducing load on the traction network. Moreover, this embodiment of this disclosure may further effectively monitor the voltage of the traction network, protect system components, and improve system safety.

According to an embodiment of this disclosure, the first controller is used to control, when the voltage of the traction network is greater than a first preset threshold, the bidirectional DC/DC converter to enter a charging mode to enable the battery to absorb the braking electric energy.

According to an embodiment of this disclosure, the first controller is used to control, when the voltage of the traction network is less than a second preset threshold, the bidirectional DC/DC converter to be disabled to enable the battery to stop absorbing the braking electric energy, where the second preset threshold is less than the first preset threshold.

According to an embodiment of this disclosure, the train further includes: a power level detector, where the power level detector is connected to the first controller, and the power level detector is used to detect a power level of the battery, where when the battery absorbs the braking electric energy, the first controller is further used to control, when the power level of the battery is greater than a first power level threshold, the bidirectional DC/DC converter to be disabled to enable the battery to stop absorbing the braking electric energy.

According to an embodiment of this disclosure, the train further includes: a mechanical brake, used to mechanically brake the train.

According to an embodiment of this disclosure, after the battery absorbs the braking electric energy, the first controller is further used to control, when the voltage of the traction network is greater than a third preset threshold, the mechanical brake to be started to brake the train in cooperation with the electric brake, where the third preset threshold is greater than the first preset threshold.

According to an embodiment of this disclosure, the second controller is used to control, when the voltage of the traction network is greater than a fourth preset threshold, the energy storage power station to perform charging.

According to an embodiment of this disclosure, the second controller is further used to control, when the voltage of the traction network is less than a fifth preset threshold, the energy storage power station to perform discharging, where the fifth preset threshold is less than the fourth preset threshold.

According to an embodiment of this disclosure, after the energy storage power station discharges to the traction network, the second controller is further used to control, when the voltage of the traction network is greater than a sixth preset threshold, the energy storage power station to stop discharging, where the sixth preset threshold is greater than the fifth preset threshold.

According to an embodiment of this disclosure, when the voltage of the traction network is less than a seventh preset threshold, the second controller controls the energy storage power station to discharge to the traction network, and at the same time, the first controller controls the bidirectional DC/DC converter to enter a discharging mode to enable the battery of the train to discharge to the traction network, where the seventh preset threshold is less than the fifth preset threshold.

According to an embodiment of this disclosure, when the battery discharges to the traction network, the first controller is further used to control, when the power level of the battery is less than a second power level threshold, the bidirectional DC/DC converter to be disabled to enable the battery to stop discharging.

According to an embodiment of this disclosure, the train further includes: a contactor detector, where the contactor detector is connected to the first controller, and the contactor detector is used to detect whether a contactor of the train is disconnected, where the first controller is further used to: after the contactor is disconnected, control the distributor to be disabled, control the bidirectional DC/DC converter to enter the discharging mode to enable the battery to supply power to the train, and control the train to run at limited power.

According to an embodiment of this disclosure, there may be a plurality of energy storage power stations, and the plurality of energy storage power stations is spaced apart according to a preset distance.

According to an embodiment of this disclosure, two energy storage power stations are disposed within every 3 to 6 kilometers, and power of the energy storage power station may be 0.5 to 2 MW.

To achieve the foregoing objectives, a train provided in an embodiment of another aspect of this disclosure includes: an electric brake; a battery; a distributor, where the distributor is connected to the electric brake, and there is a node between the distributor and the electric brake; a bidirectional DC/DC converter, where one end of the bidirectional DC/DC converter is connected to the battery, and another end of the bidirectional DC/DC converter is connected to the node; and a first controller, where the first controller is connected to the distributor and the bidirectional DC/DC converter, and the first controller is used to control, when the train is braked, the distributor and the bidirectional DC/DC converter to feed back braking electric energy of the train to the traction network, and control the bidirectional DC/DC converter according to a voltage of the traction network to absorb the braking electric energy of the train by using the battery.

When the train provided according to this embodiment of this disclosure is braked, the first controller is used to control the bidirectional DC/DC converter to feed back the braking electric energy to the traction network, and control the bidirectional DC/DC converter according to the voltage of the traction network to absorb the braking electric energy of the train by using the battery. In this embodiment of this disclosure, when the train is braked, the braking electric energy is first fed back to the traction network. In this case, if there are a relatively large quantity of trains on the traction network, the fed-back braking electric energy is evened to other trains, and therefore the voltage of the traction network is not increased greatly. On the contrary, if there are a relatively small quantity of trains on the traction network in this case, or a relatively large quantity of trains are braked in this case, the voltage of the traction network is increased. In this embodiment of this disclosure, the in-vehicle battery is preferentially used to absorb the braking electric energy, to avoid a problem that the braking electric energy is excessively large and cannot be rapidly absorbed or consumed and consequently an electric appliance of the traction network is burned. In this embodiment of this disclosure, the battery on the train is used to absorb the braking electric energy, thereby recovering and reusing the braking electric energy, reducing energy waste, and reducing load on the traction network. Moreover, this embodiment of this disclosure may further effectively monitor the voltage of the traction network, protect system components, and improve system safety.

According to an embodiment of this disclosure, the first controller is used to control, when the voltage of the traction network is greater than a first preset threshold, the bidirectional DC/DC converter to enter a charging mode to enable the battery to absorb the braking electric energy.

According to an embodiment of this disclosure, the first controller is used to control, when the voltage of the traction network is less than a second preset threshold, the bidirectional DC/DC converter to be disabled to enable the battery to stop absorbing the braking electric energy, where the second preset threshold is less than the first preset threshold.

According to an embodiment of this disclosure, the train further includes: a power level detector, where the power level detector is connected to the first controller, and the power level detector is used to detect a power level of the battery, where when the battery absorbs the braking electric energy, the first controller is further used to control, when the power level of the battery is greater than a first power level threshold, the bidirectional DC/DC converter to be disabled to enable the battery to stop absorbing the braking electric energy.

According to an embodiment of this disclosure, the train further includes: a mechanical brake, used to mechanically brake the train.

According to an embodiment of this disclosure, after the battery absorbs the braking electric energy, the first controller is further used to control, when the voltage of the traction network is greater than a third preset threshold, the mechanical brake to be started to brake the train in cooperation with the electric brake, where the third preset threshold is greater than the first preset threshold.

According to an embodiment of this disclosure, when the battery discharges to the traction network, the first controller is further used to control, when the power level of the battery is less than a second power level threshold, the bidirectional DC/DC converter to be disabled to enable the battery to stop discharging.

According to an embodiment of this disclosure, the train further includes: a contactor detector, where the contactor detector is connected to the first controller, and the contactor detector is used to detect whether a contactor of the train is disconnected, where the first controller is further used to: after the contactor is disconnected, control the bidirectional DC/DC converter to enter the discharging mode to enable the battery to supply power to the train, and control the train to run at limited power.

According to an embodiment of this disclosure, the train may be a straddle-type monorail train.

According to an embodiment of this disclosure, the train further includes: a bogie, where the bogie is suitable for straddling a rail beam; and a vehicle body, where the vehicle body is connected to the bogie and pulled by the bogie to travel along the rail beam.

According to an embodiment of this disclosure, the bogie includes: a bogie frame, where the bogie frame is suitable for straddling the rail beam and connected to the vehicle body; a running wheel, where the running wheel is pivotably mounted onto the bogie frame and fits in on an upper surface of the rail beam; a power device, where the power device is mounted onto the bogie frame and is in transmission connection to the running wheel; and a horizontal wheel, where the horizontal wheel is pivotably mounted onto the bogie frame and fits in on a side surface of the rail beam.

According to an embodiment of this disclosure, the bogie further includes: a traction device, where the traction device is mounted onto the bogie frame and connected to the vehicle body; and a support suspension device, where the support suspension device is mounted onto the bogie frame and connected to the vehicle body.

To achieve the foregoing objectives, a braking-recovery method for a train provided in an embodiment of still another aspect of this disclosure includes: braking the train, generating braking electric energy according to a braking force, and feeding back the braking electric energy to a traction network; detecting a voltage of the traction network; controlling a battery according to the voltage of the traction network to absorb the braking electric energy of the train; and controlling an energy storage power station according to the voltage of the traction network to perform charging or discharging.

According to the braking-recovery method for a train provided in this embodiment of this disclosure, at first, the train is braked, the braking electric energy is generated according to the braking force, and the braking electric energy is fed back to the traction network; then the voltage of the traction network is monitored, and the battery is controlled according to the voltage of the traction network to absorb the braking electric energy of the train; the voltage of the traction network continues to be monitored, and whether the voltage of the traction network continues to increase is judged; and if it is judged that the voltage of the traction network continues to increase, the energy storage power station is controlled to absorb the braking electric energy. Moreover, the energy storage power station may be further controlled according to the voltage of the traction network to perform discharging, thereby preventing the voltage of the traction network from being excessively low, to maintain normal operating of the traction network. In this embodiment of this disclosure, after the train is braked, the braking electric energy is first fed back to the traction network, and a quantity of trains on the traction network is judged. In this case, if there are a relatively large quantity of trains on the traction network, the fed-back braking electric energy is evenly distributed to other trains, and therefore the voltage of the traction network is not increased greatly. On the contrary, if there are a relatively small quantity of trains on the traction network or a relatively large quantity of trains are braked in this case, the voltage of the traction network is rapidly increased. In this embodiment of this disclosure, the in-vehicle battery is preferentially controlled to absorb the braking electric energy, and if the voltage of the traction network continues to increase after the in-vehicle battery absorbs the braking electric energy, the energy storage power station is controlled to absorb the braking electric energy. Because the in-vehicle battery is mounted onto the train, the battery is preferentially controlled to absorb the braking electric energy, to avoid a problem that the braking electric energy is excessively large and cannot be rapidly absorbed or consumed and consequently an electric appliance of the traction network is burned. In this embodiment of this disclosure, the battery on the train and the energy storage power station are controlled to absorb the braking electric energy, thereby recovering and reusing the braking electric energy, reducing energy waste, and reducing load on the traction network. Moreover, this embodiment of this disclosure may further effectively monitor the voltage of the traction network, protect system components, and improve system safety.

According to an embodiment of this disclosure, the controlling a battery according to the voltage of the traction network to absorb the braking electric energy of the train specifically includes: judging whether the voltage of the traction network is greater than a first preset threshold; and controlling, if the voltage of the traction network is greater than the first preset threshold, the battery to absorb the braking electric energy.

According to an embodiment of this disclosure, the braking-recovery method for a train further includes: judging whether the voltage of the traction network is less than a second preset threshold; and controlling, if the voltage of the traction network is less than the second preset threshold, the battery to stop absorbing the braking electric energy, where the second preset threshold is less than the first preset threshold.

According to an embodiment of this disclosure, the controlling the battery to absorb the braking electric energy further includes the following steps: detecting a power level of the battery, and judging whether the power level of the battery is greater than a first power level threshold; and controlling, if the power level of the battery is greater than the first power level threshold, the battery to stop absorbing the braking electric energy.

According to an embodiment of this disclosure, the braking-recovery method for a train further includes: judging whether the voltage of the traction network is greater than a third preset threshold; and controlling, when the voltage of the traction network is greater than the third preset threshold, the train to be mechanically braked in cooperation with electric braking to brake the train, where the third preset threshold is greater than the first preset threshold.

According to an embodiment of this disclosure, the controlling an energy storage power station according to the voltage of the traction network to perform charging or discharging specifically includes the following steps: judging whether the voltage of the traction network is greater than a fourth preset threshold; and controlling, if the voltage of the traction network is greater than the fourth preset threshold, the energy storage power station to perform charging.

According to an embodiment of this disclosure, the braking-recovery method for a train further includes: judging whether the voltage of the traction network is less than a fifth preset threshold; and controlling, if the voltage of the traction network is less than the fifth preset threshold, the energy storage power station to perform discharging, where the fifth preset threshold is less than the fourth preset threshold.

According to an embodiment of this disclosure, the braking-recovery method for a train further includes: judging whether the voltage of the traction network is greater than a sixth preset threshold; and controlling, when the voltage of the traction network is greater than the sixth preset threshold, the energy storage power station to stop discharging, where the sixth preset threshold is greater than the fifth preset threshold.

According to an embodiment of this disclosure, the braking-recovery method for a train further includes: judging whether the voltage of the traction network is less than a seventh preset threshold; and controlling, if the voltage of the traction network is less than the seventh preset threshold, the energy storage power station to discharge to the traction network, and at the same time, controlling the battery to discharge to the traction network, where the seventh preset threshold is less than the fifth preset threshold.

According to an embodiment of this disclosure, the controlling the battery to discharge to the traction network further includes the following steps: detecting a power level of the battery, and judging whether the power level of the battery is less than a second power level threshold; and controlling, if the power level of the battery is less than the second power level threshold, the battery to stop discharging.

According to an embodiment of this disclosure, the braking-recovery method for a train further includes: detecting whether a contactor of the train is disconnected; and controlling, if it is detected that the contactor is disconnected, the battery to supply power to the train, and controlling the train to run at limited power.

Figure 1:
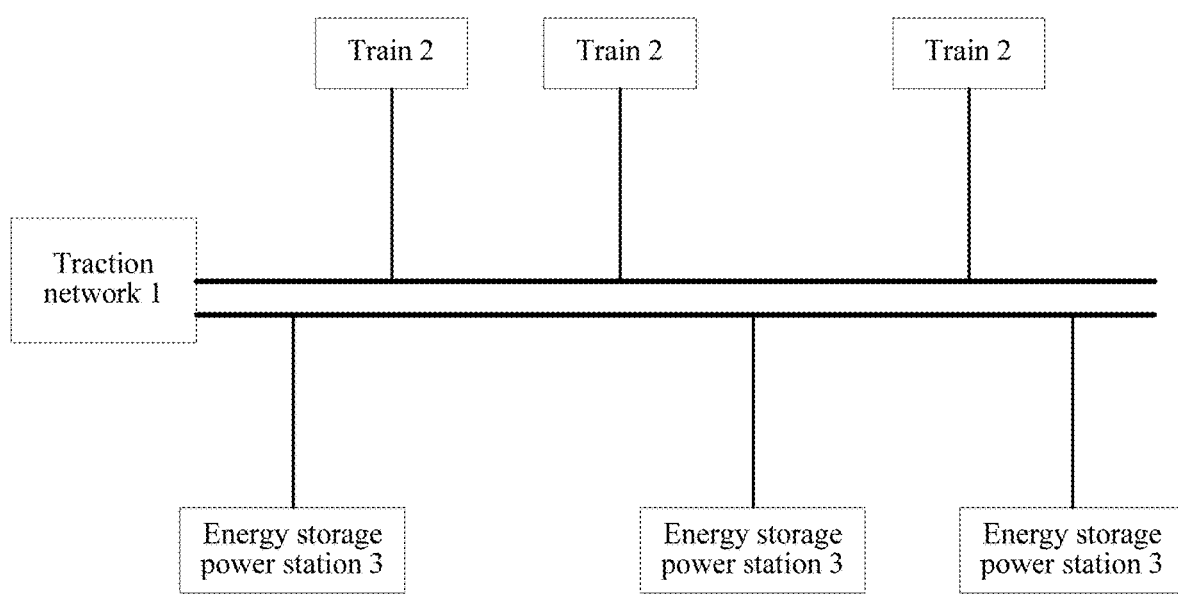
FIG. 1 is a schematic block diagram of a braking-recovery system for a train according to an embodiment of this disclosure.

Reference numerals of the accompanying drawing: traction network 1, train 2, and energy storage power station 3; electric brake 201, battery 202, distributor 203, bidirectional DC/DC converter 204, and first controller 205; power level detector 206, mechanical brake 207, and contactor detector 208; bogie 20 and vehicle body 30; bogie frame 21, running wheel 22, power device 23, and horizontal wheel 24; traction device 25 and support suspension device 26.

DETAILED DESCRIPTION

The following describes embodiments of this disclosure in detail. Examples of the embodiments are shown in the accompanying drawings. The same or similar elements and the elements having same or similar functions are denoted by like reference numerals throughout the descriptions. The following embodiments described with reference to the accompanying drawings are exemplary, and are intended to describe this disclosure and cannot be construed as a limitation to this disclosure.

A braking-recovery system and method for a train, and a train provided in this disclosure are described below with reference to the accompanying drawings.

FIG. 1 is a schematic block diagram of a braking-recovery system for a train according to an embodiment of this disclosure. As shown in FIG. 1, the braking-recovery system for a train includes: a traction network 1 (e.g., a rail power network), a plurality of trains 2 connected to the traction network 1, and a plurality of energy storage power stations 3 disposed on the traction network 1. The traction network 1 provides a direct current to the plurality of trains 2, and the train 2 is powered from the traction network 1 by using a powering device. In an embodiment of this disclosure, the train 2 is a straddle-type monorail train. In this embodiment of this disclosure, braking electric energy generated by the train 2 may be recovered by using a battery of the train 2 and/or the energy storage power station 3. The train 2 not only may absorb the braking electric energy generated by the train 2, but also may absorb braking electric energy generated by another train 2. Because a voltage of the traction network 1 is increased when the train 2 feeds back the braking electric energy to the traction network 1, the train 2 and the energy storage power station 3 may monitor the voltage of the traction network 1. When the voltage of the traction network 1 is increased, the braking electric energy may be absorbed by using the battery of the train 2 or the energy storage power station 3, thereby preventing the voltage of the traction network 1 from exceeding a maximum rated voltage to cause a fault. A specific absorption process is to be introduced in detail in the following embodiments. In this embodiment of this disclosure, the braking electric energy absorbed by the battery of the train 2 may be used for power consumption of illumination, air conditioners, and multimedia of the train 2. In another embodiment of this disclosure, the braking electric energy absorbed by the battery of the train 2 may be further used for emergency driving of the train 2. For example, when the train 2 cannot obtain electric energy from the traction network 1, the traction network 1 has a fault or there is not the traction network 1, the train 2 may switch to be driven by the battery. In this embodiment of this disclosure, the energy storage power station 3 may be disposed in a station, and absorbs braking electric energy which is used to supply power to the station, for example, supply power to air conditioners, multimedia, lighting, and the like of the station. In this embodiment of this disclosure, the energy storage power stations 3 are spaced apart according to a preset distance. For example, two energy storage power stations 3 are disposed within every 3 to 6 kilometers, and power of each energy storage power station 3 is 0.5 to 2 MW. Certainly, a person skilled in the art may select an appropriate quantity of energy storage power stations 3 and appropriate power according to a specific operating environment of the train 2.

Figure 2:
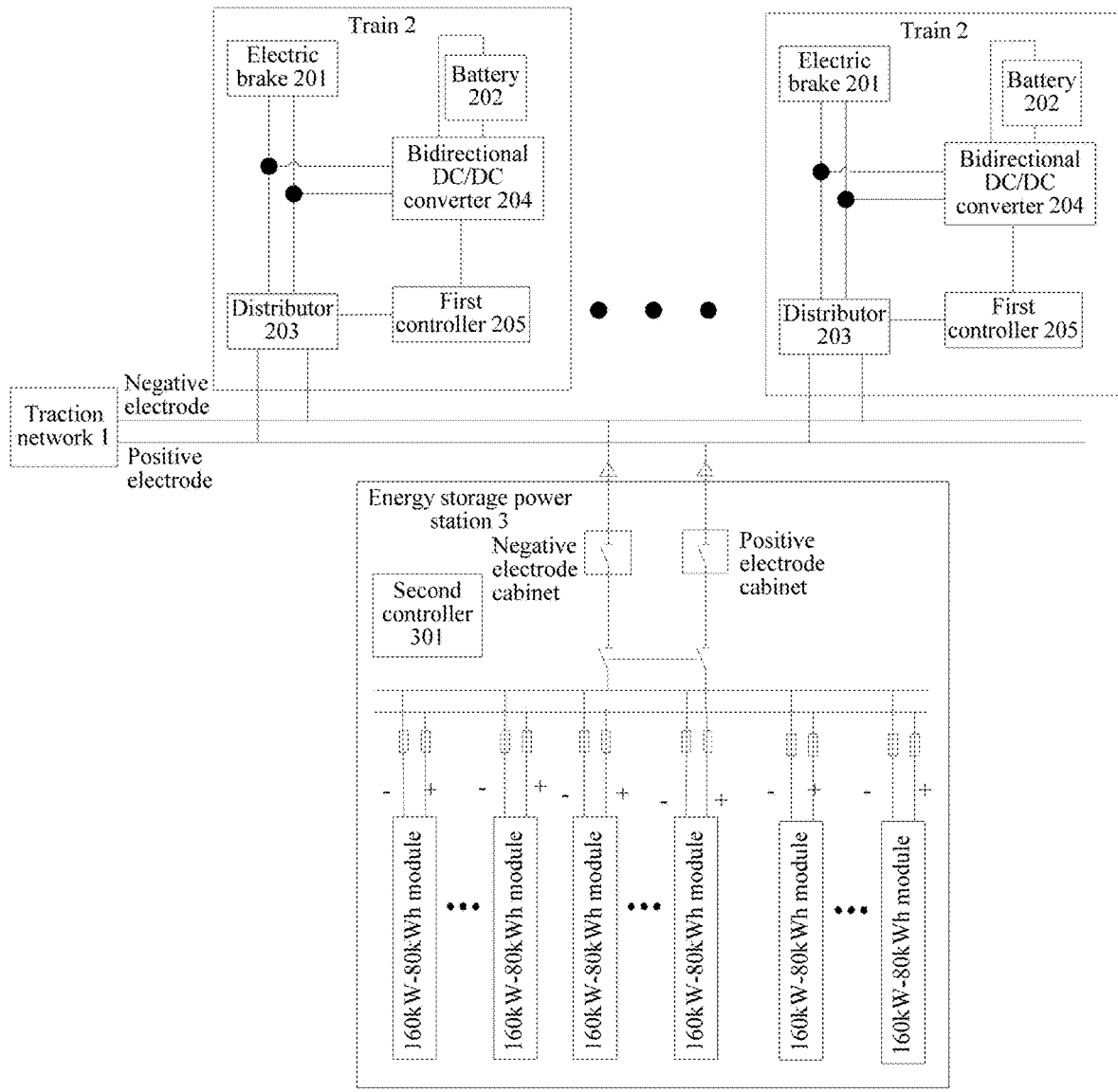
FIG. 2 is a schematic block diagram of a braking-recovery system for a train according to an embodiment of this disclosure.

FIG. 2 is a schematic block diagram of a braking-recovery system for a train according to an embodiment of this disclosure. For convenience of description, only one energy storage power station is shown in this embodiment. The train 2 includes: an electric brake 201, a battery 202, a distributor 203, a bidirectional DC/DC converter 204, and a first controller 205.

As shown in FIG. 2, the distributor 203 is connected to a traction network 1 and the electric brake 201, and there is a node between the distributor 203 and the electric brake 201. Specifically, there are a positive node and a negative node between the distributor 203 and the electric brake 201; and a first end of the bidirectional DC/DC converter 204 is connected to the battery 202, a second end of the bidirectional DC/DC converter 204 is connected to the positive node between the distributor 203 and the electric brake 201, and a third end of the bidirectional DC/DC converter 204 is connected to the negative node between the distributor 203 and the electric brake 201. The first controller 205 is used to control, when the train is braked, the distributor 203 and the bidirectional DC/DC converter 204 to feed back the braking electric energy to the traction network 1. For example, the distributor 203 is enabled, and the bidirectional DC/DC converter 204 is disabled, thereby directly feeding back the braking electric energy to the traction network 1. Moreover, the first controller 205 is connected to the distributor 203 and the bidirectional DC/DC converter 204. Specifically, the first controller 205 is connected to a fourth end of the bidirectional DC/DC converter 204, and the first controller 205 controls, according to the voltage U of the traction network 1, the bidirectional DC/DC converter 204 to be enabled, and controls the bidirectional DC/DC converter 204 to enter a charging mode, to enable the battery 202 to absorb the braking electric energy of the train 2. Moreover, in an embodiment of this disclosure, the energy storage power station 3 is connected to the traction network 1, the energy storage power station 3 includes a second controller 301, and the second controller 301 is used to control the energy storage power station 3 according to the voltage U of the traction network 1 to perform charging or discharging. The energy storage power station 3 may include at least one energy storage battery and a corresponding bidirectional DC/DC converter. In this embodiment of this disclosure, as shown in FIG. 2, the energy storage power station 3 may include a plurality of 160 KW-80 KWh modules, positive electrodes of the plurality of 160 KW-80 KWh modules are connected and are connected to a positive electrode of the traction network 1 by using a positive electrode cabinet, and negative electrodes of the plurality of 160 KW-80 KWh modules are connected and are connected to a negative electrode of the traction network 1 by using a negative electrode cabinet.

Specifically, when the train 2 is braked, a traction motor is transformed from a motor operating condition to a generator operating condition, and the electric brake 201 generates braking electric energy and feeds back the braking electric energy to the traction network 1. When a quantity of trains on the traction network 1 is relatively small, that is, load on the traction network 1 is relatively small, or a quantity of trains braked on the traction network 1 is relatively large, the braking electric energy fed back to the traction network 1 exceeds electric energy needed for running the trains on the traction network 1, thereby increasing the voltage U of the traction network 1. In this case, the first controller 205 monitors the voltage U of the traction network 1 in real time, and when the voltage U of the traction network 1 is increased, the first controller 205 is preferentially used to control the battery 202 of the train 2 to absorb the braking electric energy. At the same time, the second controller 301 of the energy storage power station 3 monitors the voltage U of the traction network 1, and if the voltage U of the traction network 1 continues to increase after the battery of the train 2 absorbs the braking electric energy, the second controller 301 controls the energy storage power station 3 to absorb electric energy from the traction network 1 to perform charging. Similarly, when the quantity of trains on the traction network 1 is relatively large, that is, the load on the traction network 1 is relatively large, the voltage U of the traction network 1 is reduced. In this case, the second controller 301 of the energy storage power station 3 monitors the voltage U of the traction network 1 in real time, and when the voltage U of the traction network 1 is reduced, the second controller 301 is preferentially used to control the energy storage power station 3 to perform discharging to increase the voltage of the traction network 1. If the voltage U of the traction network 1 continues to be reduced, the first controller 205 may also control the battery 202 to perform discharging to increase the voltage of the traction network 1.

It should be noted that, the battery 202 of the train 2 may supply power to illumination, air conditioners, and multimedia of the train. The energy storage power station 3 may be disposed in a station, so as to use recovered braking electric energy to supply power to illumination, air conditioners, multimedia, and the like of the station. In this way, the braking electric energy may be recovered and reused by using the battery 202 and the energy storage power station 3, and load on a substation may be reduced, thereby saving energy.

It should be further noted that, the battery 202 is disposed on the train 2, and may rapidly absorb the braking electric energy generated the train, and because a distance between the energy storage power station 3 and the train 2 is relatively large, the energy storage power station 3 is delayed in absorbing the braking electric energy. Therefore, in this embodiment of this disclosure, the battery 202 is preferentially selected to absorb braking electric energy, so as to rapidly absorb the braking electric energy, thereby preventing braking electric energy that is not absorbed or consumed from increasing the voltage U of the traction network 1, protecting system components, preventing an electric appliance on the traction network 1 from being damaged, and improving system safety.

According to another specific embodiment of this disclosure, if only one train 2 on the traction network 1 is running, that is, no other train on the traction network 1 absorbs the braking electric energy, and the braking electric energy generated by braking the train 2 is relatively large, the braking electric energy is mainly absorbed by the energy storage power station 3. For example, at first, the first controller 205 controls the battery 202 to absorb 30% of the braking electric energy, and then the second controller 301 controls the energy storage power station 3 to absorb 70% of the braking electric energy, so as to recover the braking electric energy.

According to still another specific embodiment of this disclosure, if a plurality of trains 2 on the traction network 1 is running, and the voltage U of the traction network 1 still continues to increase after the energy storage power station 3 absorbs the braking electric energy, a battery 202 of a non-braked train may be charged by using the non-braked train on the traction network 1. Assuming that braking electric energy not absorbed or consumed on the traction network 1 is Q' and there are N trains on the traction network 1, an average value of braking electric energy absorbed by batteries 202 of all of the trains on the traction network 1 is Q'/N. In this embodiment of this disclosure, the braking electric energy generated by braking the train is quite large. For example, as shown in Table 1, it may be seen that under operating conditions AW2 and AW3, braking electric energy greater than 220 KW is generated. In this case, if the in-vehicle battery of the train is used to absorb the braking electric energy, the in-vehicle battery of the train is quite large. Therefore, in this embodiment of this disclosure, for such a case, the battery and the energy storage power station are combined to absorb the braking electric energy, thereby preventing a large quantity of batteries from being disposed on the train.

TABLE 1

|  | AW0 | AW1 | AW2 | AW3 |
| --- | --- | --- | --- | --- |
| Initial speed (KM/H) |  |  | 80 |  |
| Braking time (s) | 18.2 | 20.3 | 27.3 | 25.2 |
| Braking distance (M) | 245 | 273.1 | 364.6 | 326.4 |
| Average deceleration (M/SS) | 1 | 1 | 0.9 | 0.8 |
| Power (KW) | 170 | 180 | >220 | >220 |

Therefore, in this embodiment of this disclosure, the battery on the train and the energy storage power station are controlled to absorb the braking electric energy, thereby recovering and reusing the braking electric energy, reducing energy waste, and reducing load on the traction network. Moreover, this embodiment of this disclosure may further effectively monitor the voltage of the traction network, protect system components, and improve system safety.

A specific operating principle of a braking-recovery system for a train according to this embodiment of this disclosure is analyzed below with reference to FIG. 3 to FIG. 7.

Figure 3:
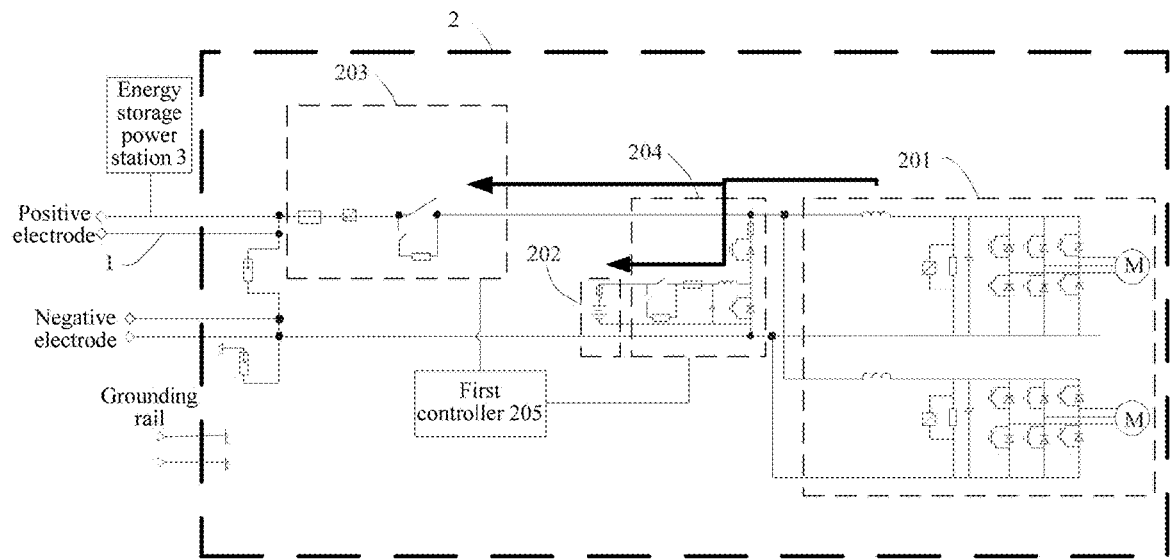
FIG. 3 is a circuit principle diagram of a braking-recovery system for a train according to an embodiment of this disclosure, where a voltage U of a traction network is greater than a first preset threshold U1.

According to an embodiment of this disclosure, as shown in FIG. 3, a first controller 205 monitors a voltage U of a traction network 1, and when the voltage U of the traction network 1 is greater than a first preset threshold U1 such as 845 V, the first controller 205 controls a bidirectional DC/DC converter 204 to be enabled, and controls the bidirectional DC/DC converter 204 to enter a charging mode, to enable a battery 202 to absorb braking electric energy. In this case, electric energy in a circuit flows according to a direction indicated by an arrow shown in FIG. 3, where braking electric energy generated by a train 2 is fed back to the traction network 1, and the battery 202 of the train 2 absorbs the braking electric energy. In this embodiment of this disclosure, when the first controller 205 controls the bidirectional DC/DC converter 204 to be enabled, and controls the bidirectional DC/DC converter 204 to enter the charging mode, the bidirectional DC/DC converter converts a direct current on a high-voltage side into a direct current matching a voltage of the battery 202, so as to charge the battery 202, that is, control the battery 202 to absorb the braking electric energy; and when the first controller 205 controls the bidirectional DC/DC converter 204 to be enabled, and controls the bidirectional DC/DC converter 204 to enter a discharging mode, the bidirectional DC/DC converter 204 is used to convert a direct current provided by the battery 202 into a direct current matching the voltage of the traction network 1, so as to control the battery 202 to perform discharging, that is, feed back the braking electric energy stored in the battery 202 to the traction network 1.

Figure 4:
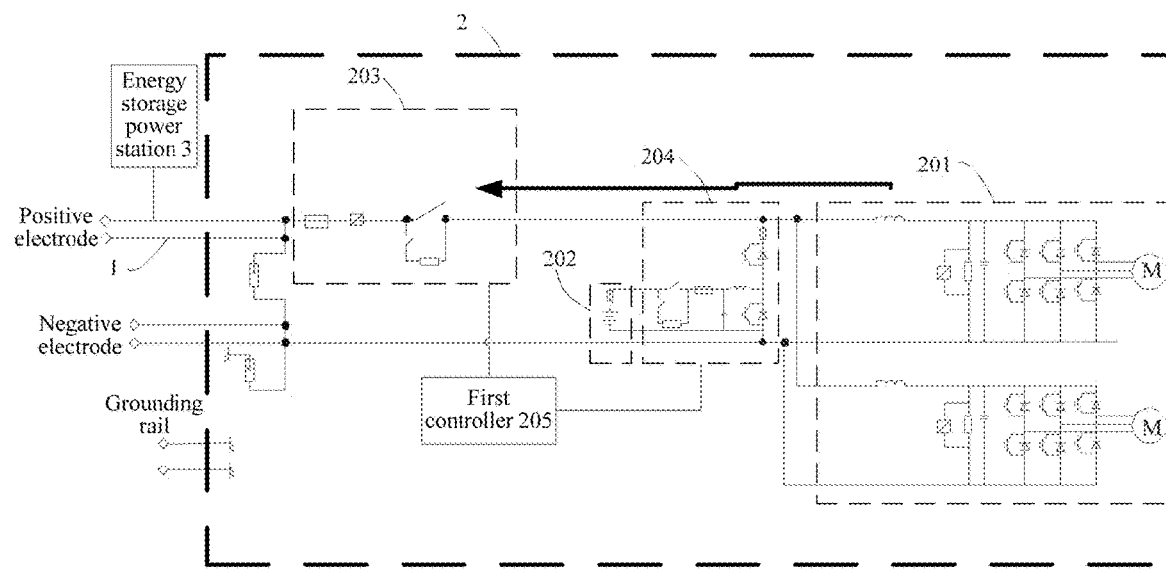
FIG. 4 is a circuit principle diagram of a braking-recovery system for a train according to an embodiment of this disclosure, where a voltage U of a traction network is less than a second preset threshold U2.

According to an embodiment of this disclosure, as shown in FIG. 4, after the battery 202 begins to absorb the braking electric energy, the voltage of the traction network 1 is decreased, and the first controller 205 continues to monitor the voltage U of the traction network 1. When the voltage U of the traction network 1 is less than a second preset threshold U2 such as 830 V, the first controller 205 controls the bidirectional DC/DC converter 204 to be disabled to enable the battery 202 to stop absorbing the braking electric energy, where the second preset threshold U2 is less than the first preset threshold U1. In this case, electric energy in a circuit flows according to a direction indicated by an arrow shown in FIG. 4. The braking electric energy generated by the train 2 is fed back to the traction network 1, and neither the battery 202 of the train 2 nor the energy storage power station 3 absorbs the braking electric energy.

Specifically, as shown in FIG. 3 and FIG. 4, when the train 2 is braked, the braking electric energy is fed back to the traction network 1, and the first controller 205 monitors the voltage U of the traction network 1 in real time. If the voltage U of the traction network 1 is greater than the first preset threshold U1 such as 845 V, indicating that in this case, the braking electric energy fed back to the traction network 1 is surplus, the first controller 205 controls the bidirectional DC/DC converter 204 to operate in the charging mode, so as to charge the battery 202 by using the braking electric energy. In this case, the braking electric energy generated by the train 2 is fed back to the traction network 1 by using the distributor 203, and the battery 202 is charged by using the bidirectional DC/DC converter 204, that is, a part of the braking electric energy is absorbed by using the battery 202. Then, if the voltage U of the traction network 1 is less than the second preset threshold U2 such as 830 V, indicating that in this case, the braking electric energy fed back to the traction network 1 and a load requirement on the traction network 1 are basically balanced, the first controller 205 controls the bidirectional DC/DC converter 204 to be disabled. In this case, the battery 202 is controlled to stop absorbing the braking electric energy, and the braking electric energy generated by the train 2 is fed back to the traction network 1 by using the distributor 203.

In this embodiment of this disclosure, the battery 202 of the train 2 is preferentially selected to absorb the braking electric energy, so as to rapidly absorb the braking electric energy, thereby preventing the braking electric energy not consumed from increasing the voltage U of the traction network 1, and preventing a device on the traction network 1 from being damaged.

Figure 5:
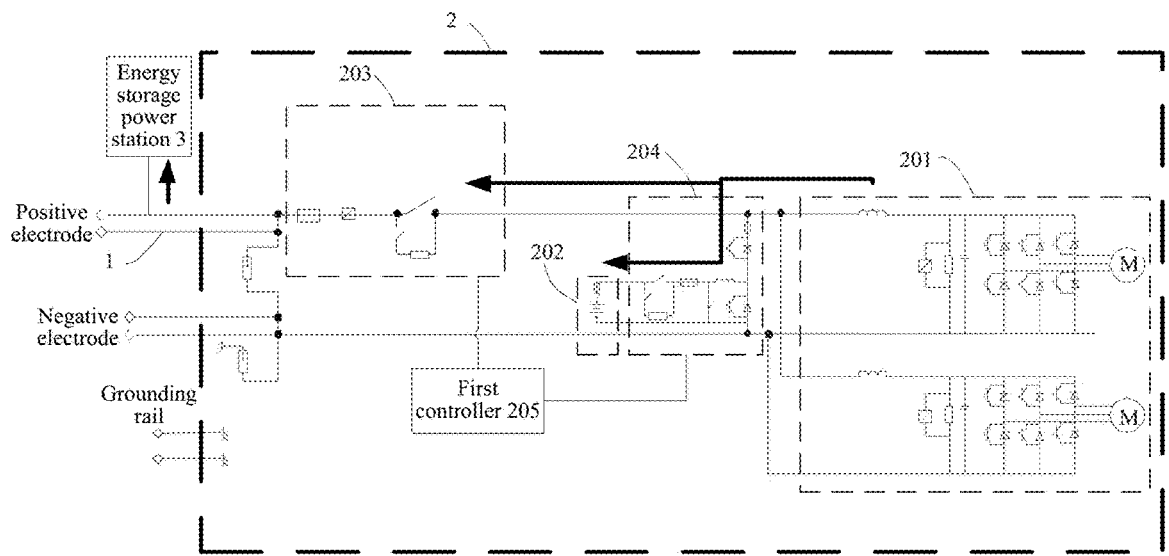
FIG. 5 is a circuit principle diagram of a braking-recovery system for a train according to an embodiment of this disclosure, where a voltage U of a traction network is greater than a fourth preset threshold U4.

According to an embodiment of this disclosure, as shown in FIG. 5, a second controller 301 monitors a voltage U of a traction network 1, and when the voltage U of the traction network 1 is greater than a fourth preset threshold U4 such as 855 V, the second controller 301 controls an energy storage power station 3 to perform charging. In this case, electric energy in a circuit flows according to a direction indicated by an arrow shown in FIG. 5. The braking electric energy generated by the train 2 is fed back to the traction network 1, and both the battery 202 of the train 2 and the energy storage power station 3 absorb the braking electric energy. In this embodiment of this disclosure, when the battery of the train 2 begins to absorb the braking electric energy, because a quantity of trains on the traction network 1 is relatively small in this case or a quantity of braked trains 2 is relatively large in this case, the voltage of the traction network 1 further continues to increase. When the voltage U of the traction network 1 is greater than the fourth preset threshold U4, the energy storage power station 3 is controlled to absorb electric energy from the traction network 1 to perform charging, thereby preventing the voltage of the traction network 1 from exceeding a maximum rated voltage.

Figure 6:
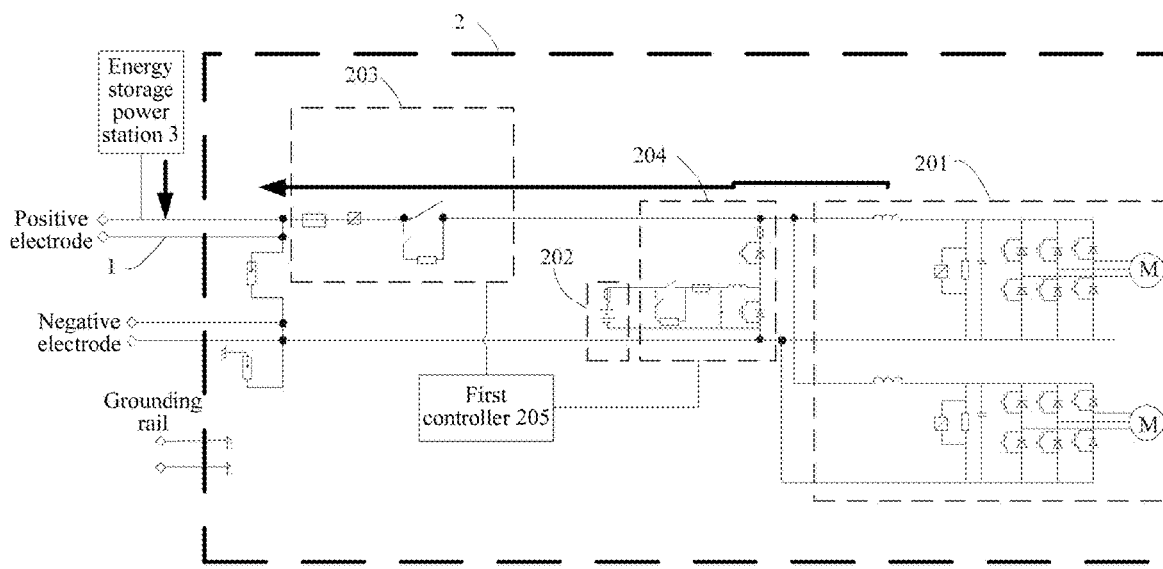
FIG. 6 is a circuit principle diagram of a braking-recovery system for a train according to an embodiment of this disclosure, where a voltage U of a traction network is less than a fifth preset threshold U5.

Similarly, according to an embodiment of this disclosure, as shown in FIG. 6, a second controller 301 monitors a voltage U of a traction network 1, and when the voltage U of the traction network 1 is less than a fifth preset threshold U5 such as 810 V, the second controller 301 controls an energy storage power station 3 to perform discharging, where the fifth preset threshold U5 is less than the fourth preset threshold U4. In this case, electric energy in a circuit flows according to a direction indicated by an arrow shown in FIG. 6. Braking electric energy generated by a train 2 is fed back to the traction network 1, and the energy storage power station 3 discharges to the traction network 1. In this embodiment of this disclosure, if a quantity of trains on the traction network 1 is relatively large, the voltage of the traction network 1 is decreased. In this case, to prevent the voltage of the traction network 1 from being less than a lowest rated voltage, the energy storage power station 3 needs to be controlled to discharge to the traction network 1. In a specific embodiment of this disclosure, there is a plurality of energy storage power stations 3 on the traction network 1, and an energy storage power station 3 whose power level is high is preferentially selected to discharge to the traction network 1. For example, discharging power of the energy storage power station 3 whose power level is high is large, and discharging power of an energy storage power station 3 whose power level is low is slightly small, thereby achieving a power level balance between the energy storage power stations 3.

According to an embodiment of this disclosure, after the energy storage power station 3 discharges to the traction network 1, the second controller 301 monitors the voltage U of the traction network 1. When the voltage U of the traction network 1 is greater than a sixth preset threshold U6, the second controller 301 controls the energy storage power station 3 to stop discharging, where the sixth preset threshold U6 is greater than the fifth preset threshold U5.

Figure 7:
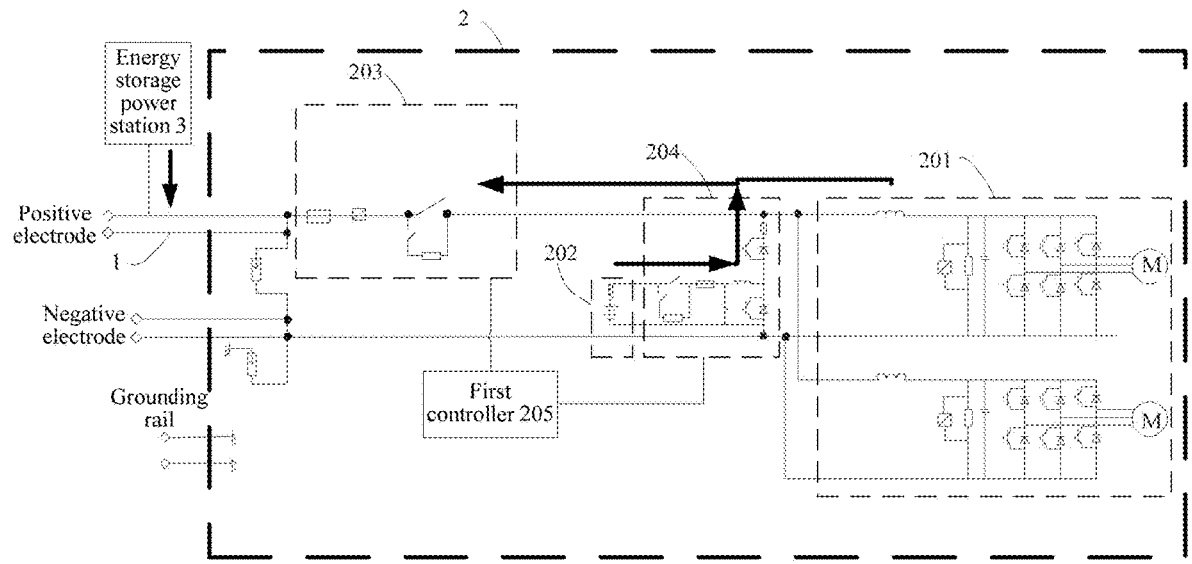
FIG. 7 is a circuit principle diagram of a braking-recovery system for a train according to an embodiment of this disclosure, where a voltage U of a traction network is less than a seventh preset threshold U7.

According to an embodiment of this disclosure, as shown in FIG. 7, a second controller 301 monitors a voltage U of a traction network 1. When the voltage U of the traction network 1 is less than a seventh preset threshold U7, the second controller 301 controls an energy storage power station 3 to discharge to the traction network 1. At the same time, a first controller 205 controls a bidirectional DC/DC converter 204 to be enabled, and controls the bidirectional DC/DC converter 204 to enter a discharging mode to enable a battery 202 of a train 2 to discharge to the traction network 1, where the seventh preset threshold U7 is less than the fifth preset threshold U5. In this case, electric energy in a circuit flows according to a direction indicated by an arrow shown in FIG. 7. Braking electric energy generated by a train 2 is fed back to the traction network 1, and both the energy storage power station 3 and the battery 202 discharge to the traction network 1. In this embodiment, if the voltage U of the traction network 1 is excessively small, both the energy storage power station 3 and the battery of the train 2 are controlled to perform discharging, thereby rapidly increasing the voltage of the traction network 1.

As shown in FIG. 5, if a quantity of trains on the traction network 1 is relatively small or a quantity of braked trains 2 is relatively large in this case, the voltage of the traction network 1 continues to increase after the battery 202 of the train 2 begins to absorb the braking electric energy. When the voltage U of the traction network 1 is greater than the fourth preset threshold U4 such as 855 V, the second controller 301 controls the energy storage power station 3 to absorb the braking electric energy from the traction network 1 to perform charging, so as to alleviate a pressure of the battery 202 in absorbing the braking electric energy, thereby preventing the voltage U of the traction network 1 from exceeding a maximum rated voltage Un of the traction network 1. As shown in FIG. 6, if a quantity of trains on the traction network 1 is relatively large, the voltage of the traction network 1 is decreased. When the voltage U of the traction network 1 is less than the fifth preset threshold U5 such as 810 V, the second controller 301 controls the energy storage power station 3 to discharge to the traction network 1.

Further, after the energy storage power station 3 discharges to the traction network 1, the voltage U of the traction network 1 is risen again, and the second controller 301 continues to monitor the voltage U of the traction network 1. When the voltage U of the traction network 1 is greater than the sixth preset threshold U6 such as 830 V, indicating that in this case, the braking electric energy fed back to the traction network 1 and load on the traction network 1 are basically balanced, the second controller 301 controls the energy storage power station 3 to stop discharging.

Furthermore, as shown in FIG. 7, if a quantity of trains on the traction network 1 is relatively large, the voltage U of the traction network 1 continues to be reduced after the energy storage power station 3 is controlled to perform discharging. When the voltage U of the traction network 1 is less than a seventh preset threshold U7, the second controller 301 controls an energy storage power station 3 to discharge to the traction network 1. At the same time, a first controller 205 controls a bidirectional DC/DC converter 204 to be enabled, and controls the bidirectional DC/DC converter 204 to enter a discharging mode to enable a battery 202 of a train 2 to discharge to the traction network 1, thereby rapidly increasing the voltage of the traction network 1. Discharging power of the battery 202 is a smaller one of maximum allowable discharging power of the battery 202 and maximum allowable discharging power of the bidirectional DC/DC converter 204.

According to an embodiment of this disclosure, there may be a plurality of energy storage power stations 3, and the plurality of energy storage power stations 3 is spaced apart according to a preset distance. In this embodiment of this disclosure, the energy storage power station 3 may be disposed in a station, and absorbed braking electric energy is used to supply power to the station, for example, supply power to air conditioners, multimedia, lighting, and the like of the station.

According to an embodiment of this disclosure, two energy storage power stations 3 may be disposed within every 3 to 6 kilometers, and power of the energy storage power station 3 may be 0.5 to 2 MW. A person skilled in the art may select an appropriate quantity of energy storage power stations 3 and appropriate power according to a specific operating environment of the train 2.

Figure 8:
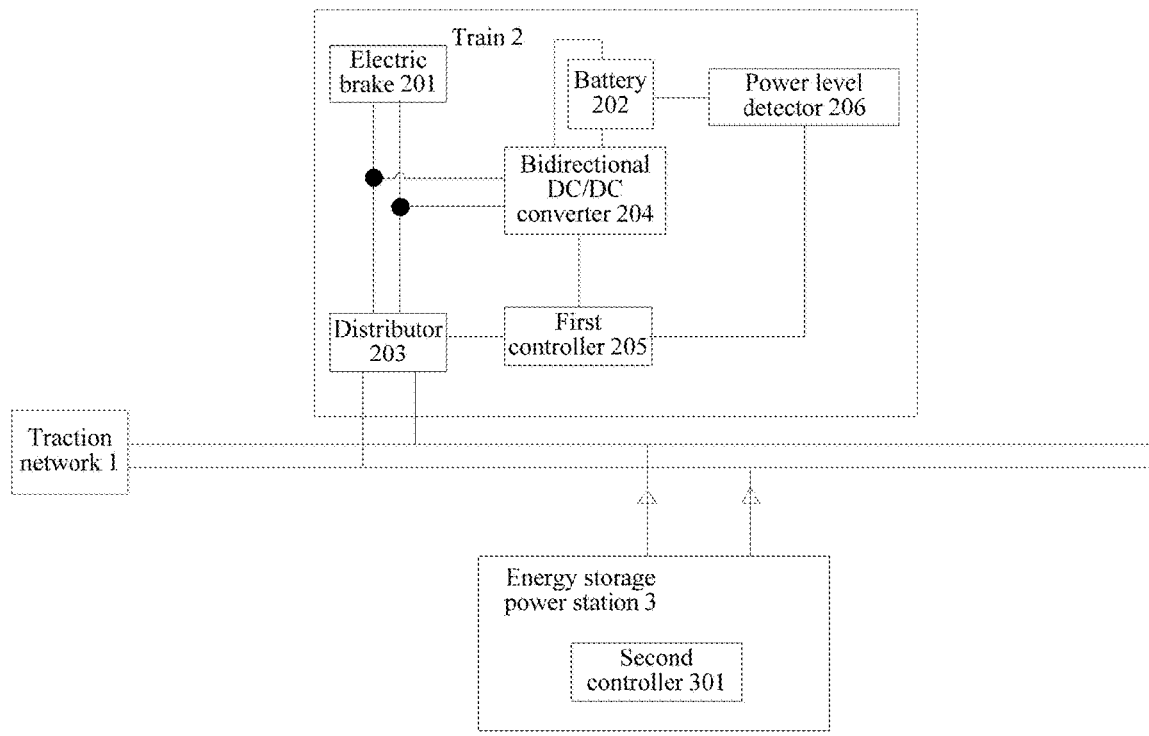
FIG. 8 is a schematic block diagram of a braking-recovery system for a train according to a specific embodiment of this disclosure.

According to an embodiment of this disclosure, as shown in FIG. 8, the train 2 further includes: a power level detector 206, where the power level detector 206 is connected to the first controller 205, and the power level detector 206 is used to detect a power level of the battery 202, where when the battery 202 absorbs the braking electric energy, if the power level Q of the battery 202 is greater than a first power level threshold Q1 such as 80%, the first controller 205 controls the bidirectional DC/DC converter 204 to be disabled to enable the battery 202 to stop absorbing the braking electric energy. In this embodiment of this disclosure, charging power and discharging power of the battery 202 are limited, the power level of the battery 202 is increased after the battery 202 absorbs the braking electric energy. If the power level of the battery 202 is excessively large, the service life of the battery 202 is affected. Therefore, when the power level Q is greater than the first power level threshold Q1, the bidirectional DC/DC converter 204 is controlled to be disabled, so as to control the battery 202 to stop absorbing the braking electric energy.

According to an embodiment of this disclosure, when the battery 202 discharges to the traction network 1, if the power level Q of the battery 202 is less than a second power level threshold Q2 such as 50%, the first controller 205 controls the bidirectional DC/DC converter 204 to be disabled to enable the battery 202 to stop discharging. In this embodiment of this disclosure, the power level of the battery 202 is reduced after the battery 202 discharges, and when the power level Q is less than the second power level threshold Q2, the bidirectional DC/DC converter 204 is controlled to be disabled, so as to control the battery 202 to stop discharging.

In an embodiment, charging power and discharging power of the battery 202 are limited, and when the first controller 205 controls the battery 202 to perform charging/discharging, the power level (state of charge, SOC) of the battery 202 is detected in real time by using the power level detector 206, and whether the battery 202 is allowed to perform charging/discharging is judged according to the power level Q of the battery 202.

In an embodiment, when the battery 202 absorbs the braking electric energy, the first controller 205 judges whether the power level Q of the battery 202 is greater than the first power level threshold Q1 such as 80%. If the power level Q of the battery 202 is greater than 80%, maximum allowable charging power of the battery 202 is limited to 0. In this case, the bidirectional DC/DC converter 204 is controlled to be disabled, so as to control the battery 202 to stop absorbing the braking electric energy. If the power level of the battery 202 is less than or equal to 80%, the bidirectional DC/DC converter 204 keeps being enabled, and the bidirectional DC/DC converter 204 is controlled to operate in the charging mode, so as to control the battery 202 to continue to absorb the braking electric energy.

Further, when the battery 202 discharges to the traction network 1, the first controller 205 judges whether the power level Q of the battery 202 is less than the second power level threshold Q2 such as 50%. If the power level Q of the battery 202 is less than 50%, the maximum allowable discharging power of the battery 202 is limited to 0. In this case, the first controller 205 controls the bidirectional DC/DC converter 204 to be disabled to control the battery 202 to stop discharging.

Figure 9:
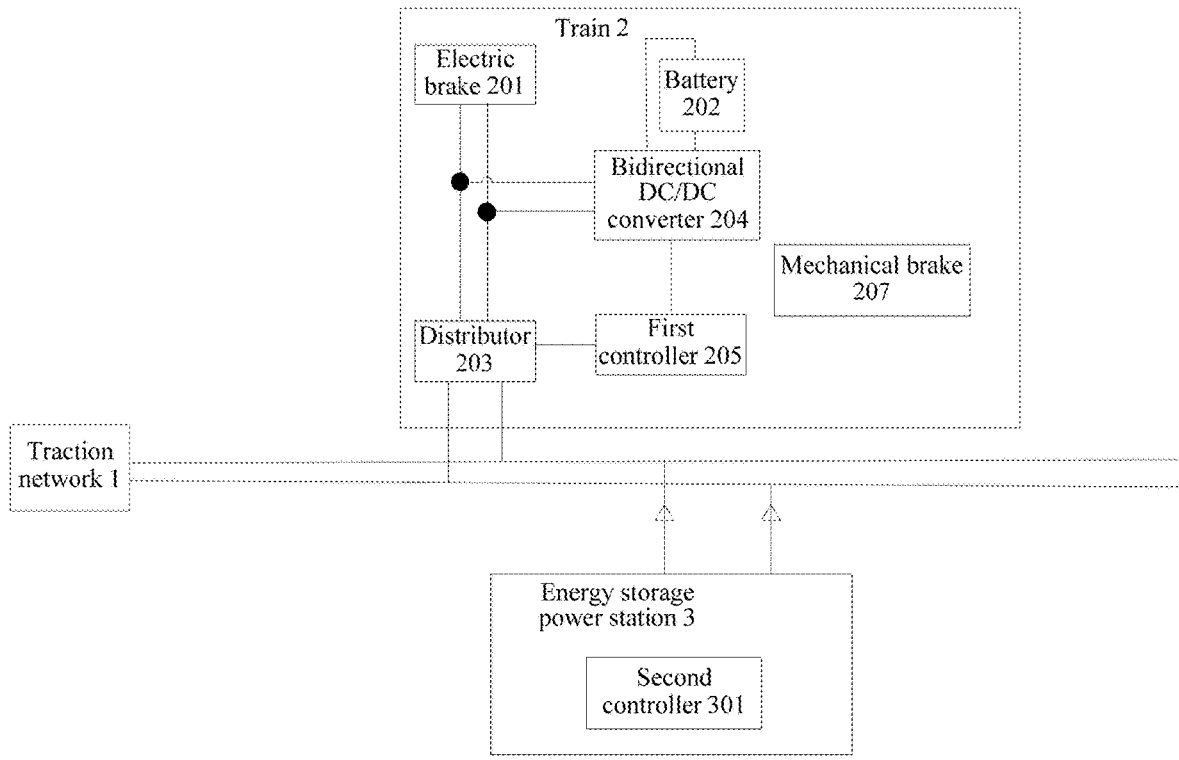
FIG. 9 is a schematic block diagram of a braking-recovery system for a train according to another specific embodiment of this disclosure.

According to an embodiment of this disclosure, as shown in FIG. 9, the train 2 further includes: a mechanical brake 207, where the mechanical brake 207 is used to mechanically brake the train 2.

According to an embodiment of this disclosure, after the battery 202 absorbs the braking electric energy, when the voltage U of the traction network 1 is greater than the third preset threshold U3, the first controller 205 controls the mechanical brake 207 to be started to brake the train 2 in cooperation with the electric brake 201, where the third preset threshold U3 is greater than the first preset threshold U1. In this embodiment of this disclosure, if a quantity of trains on the traction network 1 is relatively small or a quantity of braked trains is relatively large in this case, the voltage U of the traction network 1 continues to increase after the battery 202 and the energy storage power station 3 absorb the braking electric energy. When the voltage of the traction network 1 is greater than the third preset threshold U3, the mechanical brake 207 is controlled to be started, so as to perform auxiliary braking on the train 2.

In an embodiment, after the battery 202 and the energy storage power station 3 absorb the braking electric energy, the voltage U of the traction network 1 continues to increase, and the first controller 205 monitors the voltage U of the traction network 1 in real time. If the voltage U of the traction network 1 is greater than the third preset threshold U3, the first controller 205 controls the mechanical brake 207 to be started. In this way, auxiliary braking is performed on the train 2 through mechanical braking while the train 2 is electrically braked, so as to reduce the braking electric energy generated by the train 2, thereby preventing the voltage U of the traction network 1 from exceeding the maximum rated voltage, and precise and rapid parking may be implemented.

It should be noted that, when the train 2 is at a travelling speed less than 5 Km/h or needs to pull in and be parked, the mechanical brake 207 may be similarly controlled to be enabled to brake the train 2.

Figure 10:
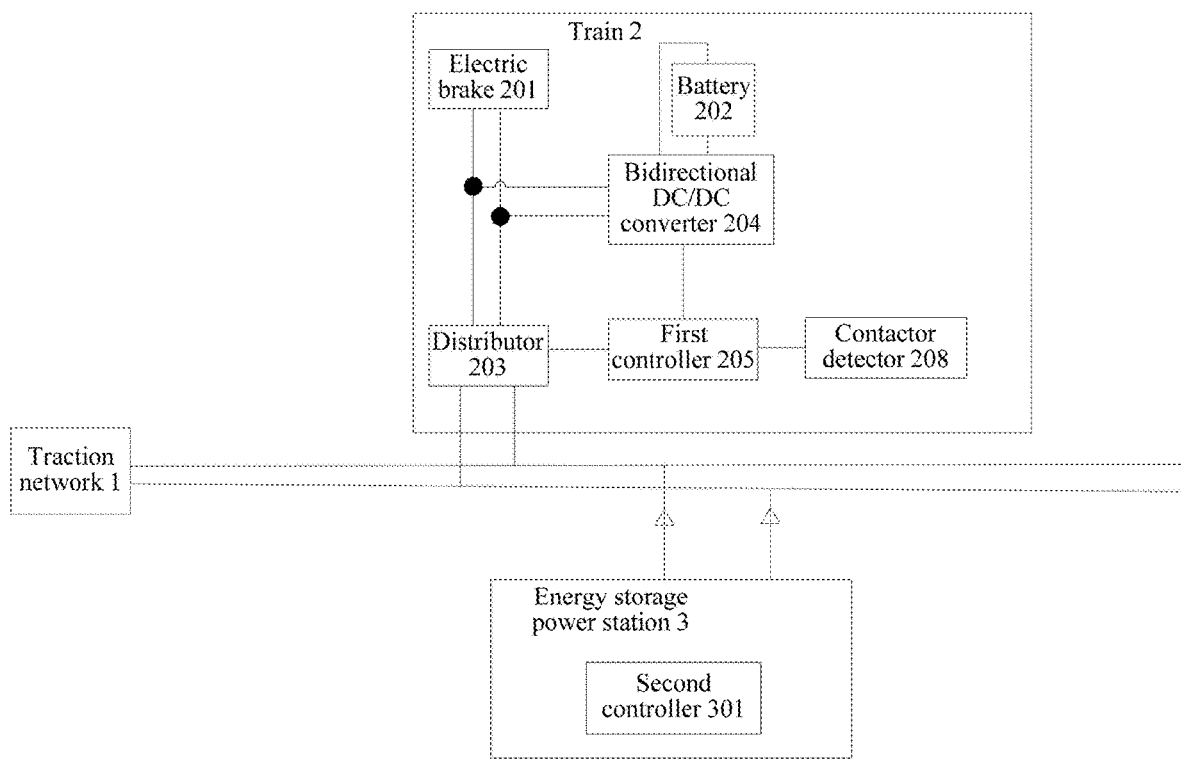
FIG. 10 is a schematic block diagram of a braking-recovery system for a train according to still another specific embodiment of this disclosure.

According to an embodiment of this disclosure, as shown in FIG. 10, the train 2 further includes: a contactor detector 208, where the contactor detector 208 is connected to the first controller 205, and the contactor detector 208 is used to detect whether a contactor of the train is disconnected, where after it is detected that the contactor is disconnected, the first controller 205 controls the bidirectional DC/DC converter 204 to be enabled, controls the bidirectional DC/DC converter 204 to enter the discharging mode, to enable the battery 202 to supply power to the train 2, and controls the train 2 to run at limited power.

In an embodiment, when the contactor detector 208 detects that the contactor is disconnected, indicating that the train 2 is in an abnormal power supply state, the first controller 205 judges that the train 2 enters an emergency driving mode, and sends an emergency traction signal, so as to control the bidirectional DC/DC converter 204 to be enabled, and control the bidirectional DC/DC converter 204 to enter the discharging mode. In this case, the battery 202 supplies power to the train 2. Moreover, the first controller 205 controls the discharging power of the battery 202 to be less than or equal to a preset power threshold such as 70 KW, to enable the train 2 to run in a limited power state.

Therefore, emergency driving of the train is implemented by using the battery 202, to avoid a problem of difficult scheduling caused because the train is broken down midway, and also prevent the faulty train from occupying a running line.

As described above, as shown in FIG. 11, an example in which a voltage level of the traction network 1 is 750 VDC is used, and a policy for recovering and reusing braking electric energy in an embodiment of this disclosure is described as follows:

(1) Recovery of Braking Electric Energy

According to an embodiment of this disclosure, when a train is braked, braking electric energy is allocated comprehensively according to a voltage of the traction network 1, a power level of an in-vehicle battery 202, and a quantity of trains 2 on the traction network 1. After the braking electric energy is fed back to the traction network 1, the braking electric energy is first consumed or absorbed by another train on the traction network, the first controller 205 preferentially controls the battery 202 to absorb surplus braking electric energy. When the in-vehicle battery 202 cannot absorb the surplus braking electric energy or has a limited absorption capability, the second controller 301 controls the energy storage power station 3 to absorb the surplus braking electric energy.

Figure 11:
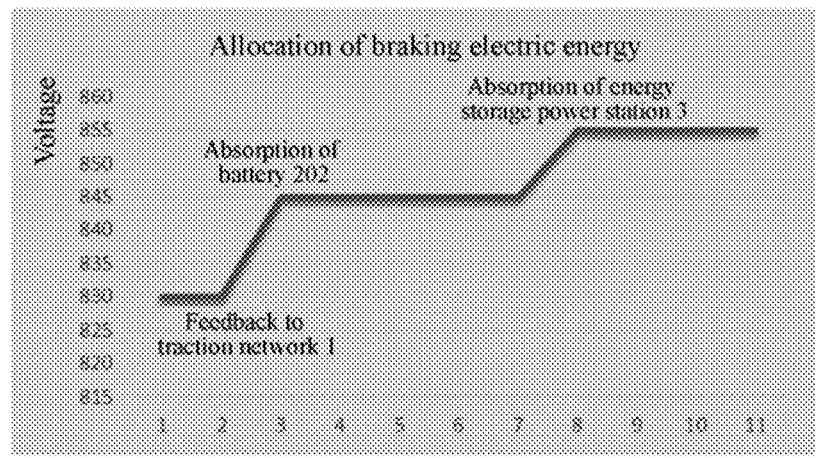
FIG. 11 is a schematic diagram of an operating principle of a braking-recovery system for a train according to a specific embodiment of this disclosure.

Specifically, as shown in FIG. 11, when the train 2 is braked, the braking electric energy is fed back to the traction network 1, whether the power level Q of the battery 202 is less than or equal to the first power level threshold Q1 is first judged. If the power level Q is less than or equal to the first power level threshold Q1, the battery 202 may absorb the braking electric energy. In this case, the first controller 205 monitors the voltage U of the traction network 1 in real time. If a quantity of trains on the traction network 1 is relatively small, that is, load on the traction network 1 is relatively small, or a quantity of braked trains on the traction network 1 is relatively large, the voltage of the traction network 1 is increased. When the voltage U of the traction network 1 is greater than the first preset threshold U1 such as 845 V, the battery 202 of the train 2 is controlled to absorb the braking electric energy. If the voltage U of the traction network 1 continues to increase after the battery of the train 2 absorbs the braking electric energy, when the voltage U of the traction network 1 is greater than the fourth preset threshold U4 such as 855 V, the second controller 301 controls the energy storage power station 3 to absorb the braking electric energy. In this embodiment of this disclosure, after the battery 202 and the energy storage power station 3 are controlled to absorb the braking electric energy, the voltage U of the traction network 1 is reduced. When the voltage U of the traction network 1 is less than or equal to the second preset threshold U2 such as 830 V, the battery 202 and the energy storage power station 3 are controlled to stop absorbing the braking electric energy.

To be specific, as shown in FIG. 11, when the voltage U of the traction network 1 reaches the fourth preset threshold U4, the energy storage power station 3 is controlled to begin to absorb the braking electric energy; when the voltage U of the traction network 1 is greater than the first preset threshold U1 and less than the fourth preset threshold U4, the battery 202 is controlled to absorb the braking electric energy; and when the voltage U of the traction network 1 is less than the second preset threshold U2, the braking electric energy is fed back to only the traction network 1.

(2) Reuse of Braking Electric Energy

When the train 2 starts or a quantity of trains running on the traction network 1 is relatively large, the voltage U of the traction network 1 is reduced. In this case, electric energy loss of the traction network 1 may be supplemented by releasing the braking electric energy recovered by the battery 202 and the energy storage power station 3 to the traction network 1. Specifically, whether the power level Q of the battery 202 is greater than or equal to the second power level threshold Q2 is first judged. If the power level Q is greater than or equal to the second power level threshold Q2, the battery 202 may perform discharging. In this case, the second controller 301 monitors the voltage U of the traction network 1 in real time. When the voltage U of the traction network 1 is less than the fifth preset threshold U5 such as 810 V, the energy storage power station 3 is controlled to perform discharging. Further, the first controller 205 monitors the voltage U of the traction network 1, and whether the voltage U of the traction network 1 is less than the seventh preset threshold U7 is judged. If the first controller 205 judges that the voltage U of the traction network 1 is less than the seventh preset threshold U7, the second controller 301 controls the energy storage power station 3 to perform discharging. Moreover, the first controller 205 controls the bidirectional DC/DC converter 204 to be enabled, and controls the bidirectional DC/DC converter 204 to enter the discharging mode, to enable the battery 202 of the train 2 to discharge to the traction network 1.

In addition, when the traction network 1 has a power supply fault, the battery 202 may be controlled to enter the discharging mode, so as to implement emergency driving of the train 2.

In this way, the braking electric energy absorbed by the battery 202 and the energy storage power station 3 may be consumed, to enable the battery 202 and the energy storage power station 3 to continue to recover the braking electric energy, thereby saving the operating costs.

To sum up, according to the braking-recovery system for a train provided in this embodiment of this disclosure, when the train is braked, the first controller controls the distributor and the bidirectional DC/DC converter to feed back the braking electric energy to the traction network, and controls the bidirectional DC/DC converter according to the voltage of the traction network to absorb the braking electric energy of the train by using the battery. When the voltage of the traction network continues to increase, the energy storage power station is reused to absorb the braking electric energy. Moreover, the energy storage power station may further discharge to the traction network according to the voltage of the traction network, thereby preventing the voltage of the traction network from being excessively low, to maintain normal operating of the traction network. In this embodiment of this disclosure, when the train is braked, the braking electric energy is first fed back to the traction network. In this case, if there are a relatively large quantity of trains on the traction network, the fed-back braking electric energy is evened to other trains, and therefore the voltage of the traction network is not increased greatly. On the contrary, if there are a relatively small quantity of trains on the traction network in this case, or a relatively large quantity of trains are braked in this case, the voltage of the traction network is increased. In this embodiment of this disclosure, the in-vehicle battery is preferentially used to absorb the braking electric energy, and if the voltage of the traction network continues to increase after the in-vehicle battery absorbs the braking electric energy, the energy storage power station is then used to absorb the braking electric energy. Because the in-vehicle battery is mounted onto the train, the battery is preferentially used to absorb the braking electric energy, to avoid a problem that the braking electric energy is excessively large and cannot be rapidly absorbed or consumed and consequently an electric appliance of the traction network is burned. In this embodiment of this disclosure, the battery on the train and the energy storage power station are used to absorb the braking electric energy, thereby recovering and reusing the braking electric energy, reducing energy waste, and reducing load on the traction network. Moreover, this embodiment of this disclosure may further effectively monitor the voltage of the traction network, protect system components, and improve system safety.

Figure 12:
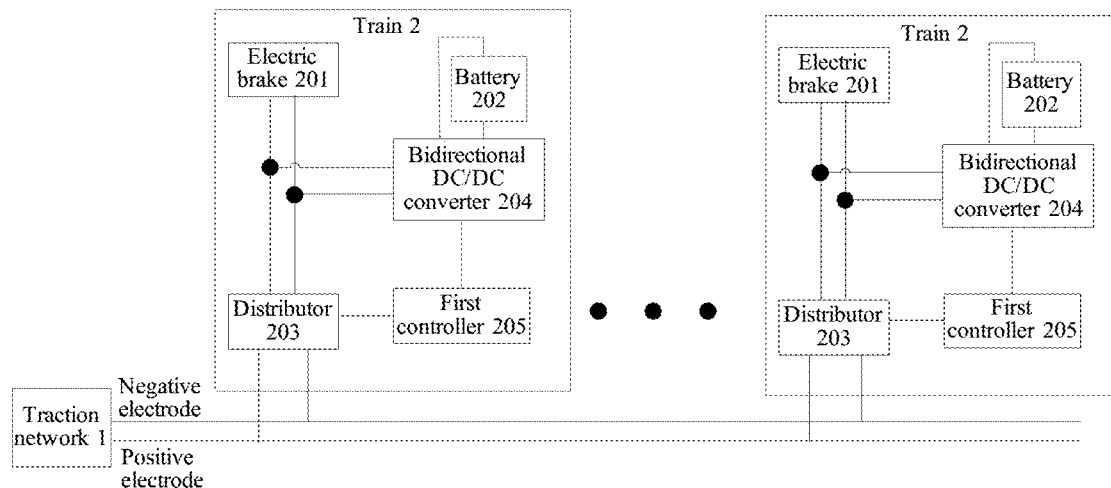
FIG. 12 is a schematic block diagram of a train according to an embodiment of this disclosure.

FIG. 12 is a schematic block diagram of a train according to an embodiment of this disclosure. As shown in FIG. 12, the train 2 includes: an electric brake 201, a battery 202, a distributor 203, a bidirectional DC/DC converter 204, and a first controller 205.

The distributor 203 is connected to a traction network 1 and the electric brake 201, and there is a node between the distributor 203 and the electric brake 201. One end of the bidirectional DC/DC converter 204 is connected to the battery 202, and another end of the bidirectional DC/DC converter 204 is connected to a node between the distributor 203 and the electric brake 201. The first controller 205 is connected to the distributor 203 and the bidirectional DC/DC converter 204. The first controller 205 is used to control, when the train 2 is braked, the distributor 203 and the bidirectional DC/DC converter 204 to feed back the braking electric energy to the traction network 1. For example, the distributor 203 is enabled, and the bidirectional DC/DC converter 204 is disabled, thereby directly feeding back the braking electric energy to the traction network 1. Moreover, the first controller 205 controls, according to the voltage of the traction network 1, the bidirectional DC/DC converter 204 to be enabled, and controls the bidirectional DC/DC converter 204 to enter a charging mode, to enable the battery 202 to absorb the braking electric energy of the train.

Specifically, when the train 2 is braked, a traction motor is transformed from a motor operating condition to a generator operating condition, and the electric brake 201 generates braking electric energy and feeds back the braking electric energy to the traction network 1. When a quantity of trains on the traction network 1 is relatively small, that is, load on the traction network 1 is relatively small, or a quantity of trains braked on the traction network 1 is relatively large, the braking electric energy fed back to the traction network 1 exceeds electric energy needed for running the trains on the traction network 1, thereby increasing the voltage U of the traction network 1. In this case, the first controller 205 monitors the voltage U of the traction network 1 in real time, and when the voltage U of the traction network 1 is increased, the battery 202 is controlled to absorb the braking electric energy. Similarly, when the quantity of trains on the traction network 1 is relatively large, that is, the load on the traction network 1 is relatively large, the voltage U of the traction network 1 is reduced. The first controller 205 controls the battery 202 to perform discharging to increase the voltage of the traction network 1.

It should be noted that, the battery 202 of the train 2 may supply power to illumination, air conditioners, and multimedia of the train. In this way, the braking electric energy may be recovered and reused by using the battery 202, and load on a substation may be reduced, thereby saving energy.

It should be further noted that, the battery 202 is disposed on the train 2, and may rapidly absorb the braking electric energy generated the train. Therefore, in this embodiment of this disclosure, the battery 202 is preferentially selected to absorb braking electric energy, so as to rapidly absorb the braking electric energy, thereby preventing braking electric energy that is not absorbed or consumed from increasing the voltage U of the traction network 1, protecting system components, preventing an electric appliance on the traction network 1 from being damaged, and improving system safety.

According to an embodiment of this disclosure, a first controller 205 detects a voltage U of a traction network 1, and when the voltage U of the traction network 1 is greater than a first preset threshold U1 such as 845 V, the first controller 205 controls a bidirectional DC/DC converter 204 to enter a charging mode, to enable a battery 202 to absorb braking electric energy. In this case, the first controller 205 controls the bidirectional DC/DC converter to enter the charging mode, to convert a direct current on a high-voltage side into a direct current matching a voltage of the battery 202, so as to charge the battery 202, that is, absorb the braking electric energy by using the battery 202. In this embodiment of this disclosure, when the first controller 205 controls the bidirectional DC/DC converter to enter the discharging mode, the bidirectional DC/DC converter 204 is used to convert a direct current provided by the battery 202 into a direct current matching the voltage of the traction network 1, so as to control the battery 202 to perform discharging, that is, feed back the braking electric energy stored in the battery 202 to the traction network 1.

According to an embodiment of this disclosure, after the battery 202 begins to absorb the braking electric energy, the voltage of the traction network 1 is decreased, and the first controller 205 detects the voltage U of the traction network 1. When the voltage U of the traction network 1 is less than a second preset threshold U2 such as 830 V, the first controller 205 controls the bidirectional DC/DC converter 204 to be disabled to enable the battery 202 to stop absorbing the braking electric energy, where the second preset threshold U2 is less than the first preset threshold U1.

In an embodiment, when the train 2 is braked, the braking electric energy is fed back to the traction network 1, and the first controller 205 monitors the voltage U of the traction network 1 in real time. If the voltage U of the traction network 1 is greater than the first preset threshold U1 such as 845 V, indicating that in this case, the braking electric energy fed back to the traction network 1 is surplus, the first controller 205 controls the bidirectional DC/DC converter 204 to operate in the charging mode, so as to charge the battery 202 by using the braking electric energy. In this case, the braking electric energy generated by the train 2 is fed back to the traction network 1 by using the distributor 203, and the battery 202 is charged by using the bidirectional DC/DC converter 204, that is, a part of the braking electric energy is absorbed by using the battery 202. Then, if the voltage U of the traction network 1 is less than the second preset threshold U2 such as 830 V, indicating that in this case, the braking electric energy fed back to the traction network 1 and a load requirement on the traction network 1 are basically balanced, the first controller 205 controls the bidirectional DC/DC converter 204 to be disabled. In this case, the battery 202 is controlled to stop absorbing the braking electric energy, and the braking electric energy generated by the train 2 is fed back to the traction network 1 by using the distributor 203.

In this embodiment of this disclosure, the battery 202 of the train 2 is preferentially selected to absorb the braking electric energy, so as to rapidly absorb the braking electric energy, thereby preventing the braking electric energy not consumed from increasing the voltage U of the traction network 1, and preventing a device on the traction network 1 from being damaged.

Figure 13:
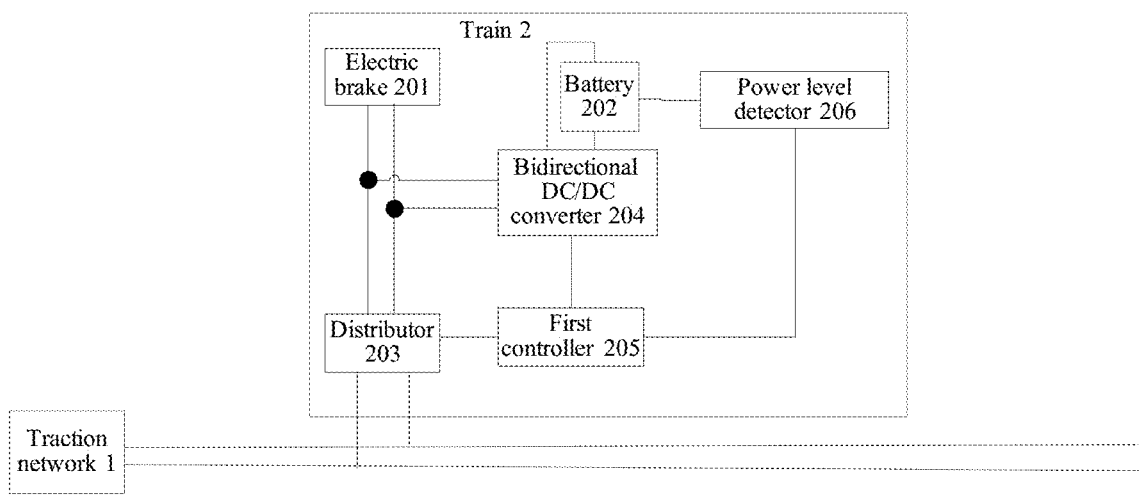
FIG. 13 is a schematic block diagram of a train according to a specific embodiment of this disclosure.

According to an embodiment of this disclosure, as shown in FIG. 13, the train 2 further includes: a power level detector 206, where the power level detector 206 is connected to the first controller 205, and the power level detector 206 is used to detect a power level of the battery 202, where when the battery 202 absorbs the braking electric energy, if the power level Q of the battery 202 is greater than the first power level threshold Q1 such as 80%, the first controller 205 controls the bidirectional DC/DC converter 204 to be disabled to enable the battery to stop absorbing the braking electric energy. In this embodiment of this disclosure, charging power and discharging power of the battery 202 are limited, the power level of the battery 202 is increased after the battery 202 absorbs the braking electric energy. If the power level of the battery 202 is excessively large, the service life of the battery 202 is affected. Therefore, when the power level Q is greater than the first power level threshold Q1, the bidirectional DC/DC converter 204 is controlled to be disabled, so as to control the battery 202 to stop absorbing the braking electric energy.

According to an embodiment of this disclosure, when the battery 202 discharges to the traction network 1, if the power level Q of the battery 202 is less than a second power level threshold Q2 such as 50%, the first controller 205 controls the bidirectional DC/DC converter 204 to be disabled to enable the battery 202 to stop discharging.

Specifically, charging power and discharging power of the battery 202 are limited, and when the first controller 205 controls the battery 202 to perform charging/discharging, the power level (state of charge, SOC) of the battery 202 is detected in real time by using the power level detector 206, and whether the battery 202 is allowed to perform charging/discharging is judged according to the power level Q of the battery 202.

When the battery 202 absorbs the braking electric energy, the first controller 205 judges whether the power level Q of the battery 202 is greater than the first power level threshold Q1 such as 80%. If the power level Q of the battery 202 is greater than 80%, charging power of the battery 202 is limited to 0. In this case, the first controller 205 controls the bidirectional DC/DC converter 204 to be disabled, so as to control the battery 202 to stop absorbing the braking electric energy. If the power level of the battery 202 is less than or equal to 80%, the bidirectional DC/DC converter 204 keeps being enabled, and the bidirectional DC/DC converter 204 is controlled to operate in the charging mode, so as to control the battery 202 to continue to absorb the braking electric energy.

Further, when the battery 202 discharges to the traction network 1, the first controller 205 judges whether the power level Q of the battery 202 is less than the second power level threshold Q2 such as 50%. If the power level Q of the battery 202 is less than 50%, the discharging power of the battery 202 is limited to 0. In this case, the first controller 205 controls the bidirectional DC/DC converter 204 to be disabled to control the battery 202 to stop discharging.

Figure 14:
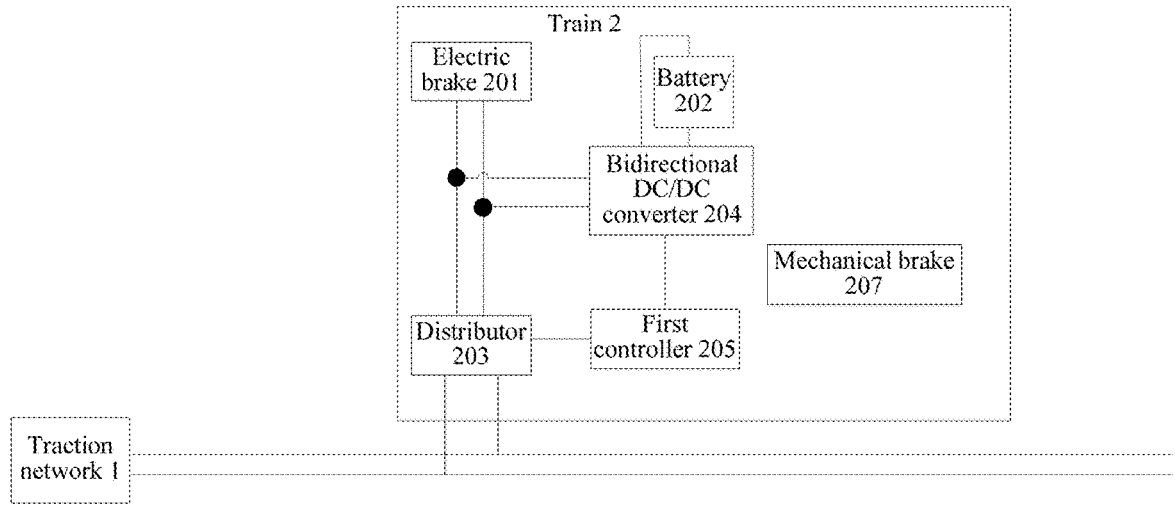
FIG. 14 is a schematic block diagram of a train according to another specific embodiment of this disclosure.

According to an embodiment of this disclosure, as shown in FIG. 14, the train 2 further includes: a mechanical brake 207, where the mechanical brake 207 is used to mechanically brake the train 2.

According to an embodiment of this disclosure, after the battery 202 absorbs the braking electric energy, when the voltage U of the traction network 1 is greater than the third preset threshold U3, the first controller 205 controls the mechanical brake 207 to be started to brake the train 2 in cooperation with the electric brake 201, where the third preset threshold U3 is greater than the first preset threshold U1. In this embodiment of this disclosure, if a quantity of trains on the traction network 1 is relatively small or a quantity of braked trains is relatively large in this case, the voltage U of the traction network 1 continues to increase after the battery 202 absorbs the braking electric energy. When the voltage of the traction network 1 is greater than the third preset threshold U3, the mechanical brake 207 is controlled to be started, so as to perform auxiliary braking on the train 2.

Specifically, after the battery 202 absorbs the braking electric energy, the first controller 205 monitors the voltage U of the traction network 1 in real time. If the voltage U of the traction network 1 is greater than the third preset threshold U3, the first controller 205 controls the mechanical brake 207 to be started. In this way, auxiliary braking is performed on the train 2 through mechanical braking while the train 2 is electrically braked, so as to reduce the braking electric energy generated by the train 2, thereby preventing the voltage U of the traction network 1 from exceeding the maximum rated voltage, and precise and rapid parking may be implemented.

It should be noted that, when the train 2 is at a travelling speed less than 5 Km/h or needs to pull in and be parked, the mechanical brake 207 may be similarly controlled to be enabled to brake the train 2.

Figure 15:
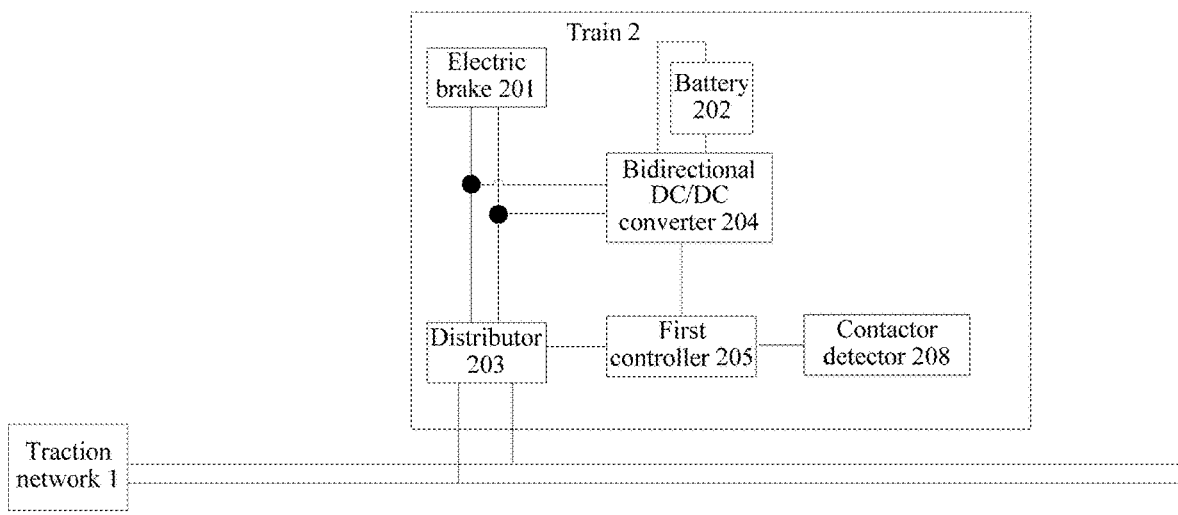
FIG. 15 is a schematic block diagram of a train according to still another specific embodiment of this disclosure.

According to an embodiment of this disclosure, as shown in FIG. 15, the train 2 further includes: a contactor detector 208, where the contactor detector 208 is connected to the first controller 205, and the contactor detector 208 is used to detect whether a contactor of the train 2 is disconnected, where after it is detected that the contactor is disconnected, the first controller 205 controls the bidirectional DC/DC converter 204 to enter the discharging mode, to enable the battery 202 to supply power to the train 2, and controls the train 2 to run at limited power.

Specifically, when the contactor detector 208 detects that the contactor is disconnected, indicating that the train 2 is in an abnormal power supply state, for example, the traction network 1 is faulty and powered off, the first controller 205 judges that the train 2 enters an emergency driving mode, and sends an emergency traction signal, so as to control the bidirectional DC/DC converter 204 to be enabled, and control the bidirectional DC/DC converter 204 to enter the discharging mode. In this case, the battery 202 supplies power to the train 2. Moreover, the first controller 205 controls the discharging power of the battery 202 to be less than or equal to a preset power threshold such as 70 KW, to enable the train 2 to run in a limited power state.

Therefore, emergency driving of the train is implemented by using the battery 202, to avoid a problem of difficult scheduling caused because the train is broken down midway, and also prevent the faulty train from occupying a running line.

According to a specific embodiment of this disclosure, the train 2 may be a straddle-type monorail train.

Figure 16:
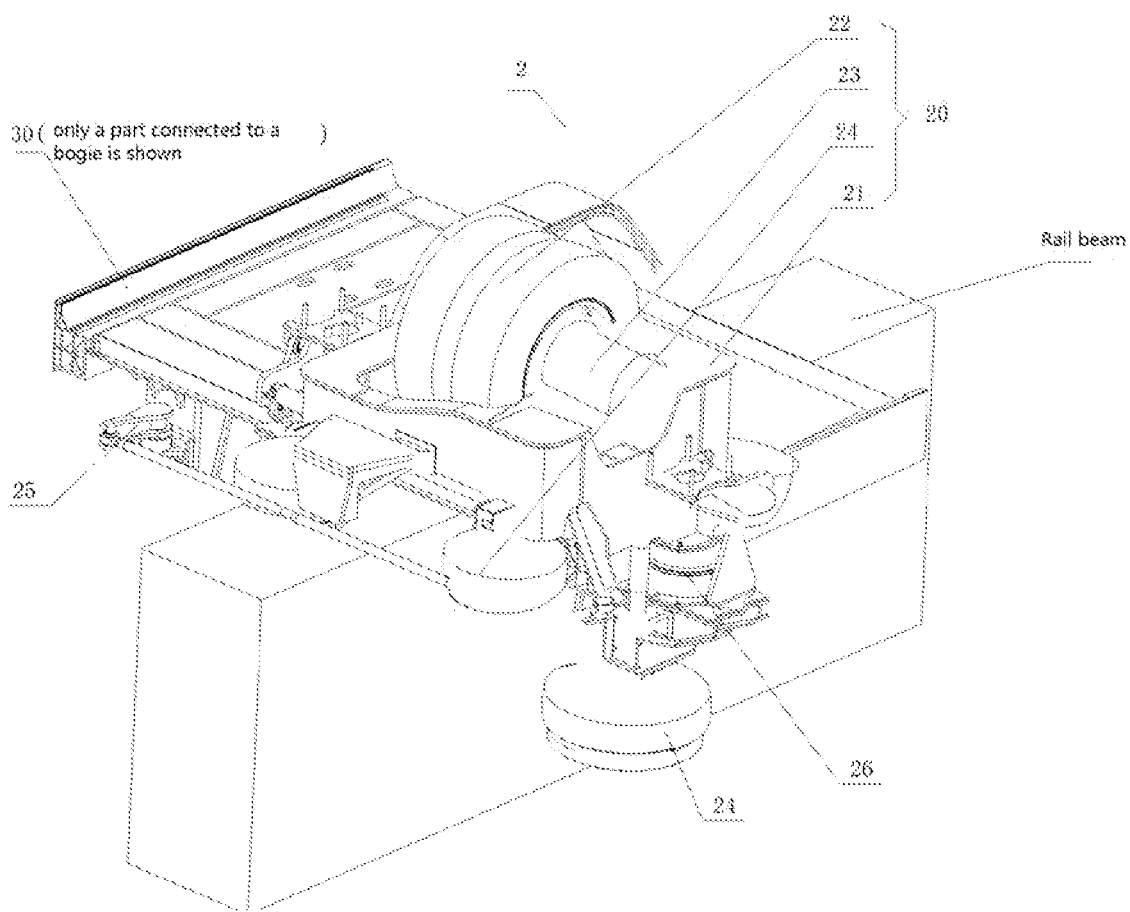
FIG. 16 is a schematic structural diagram of a train according to a specific embodiment of this disclosure.

According to an embodiment of this disclosure, as shown in FIG. 16, the train 2 further includes: a bogie 20 and a vehicle body 30, where the bogie 20 is suitable for straddling a rail beam; and the vehicle body 30 is connected to the bogie 20 and pulled by the bogie 20 to travel along the rail beam.

According to an embodiment of this disclosure, as shown in FIG. 16, the bogie 20 includes: a bogie frame 21, a running wheel 22, a power device 23, and a horizontal wheel 24, where the bogie frame 21 is suitable for straddling the rail beam and connected to the vehicle body 30; the running wheel 22 is pivotably mounted onto the bogie frame 21 and fits in on an upper surface of the rail beam; the power device 23 is mounted onto the bogie frame 21 and is in transmission connection to the running wheel 22; and the horizontal wheel 24 is pivotably mounted onto the bogie frame 21 and fits in on a side surface of the rail beam.

According to an embodiment of this disclosure, as shown in FIG. 16, the bogie 20 further includes: a traction device 25 and a support suspension device 26, where the traction device 25 is mounted onto the bogie frame 21 and connected to the vehicle body 30; and the support suspension device 26 is mounted onto the bogie frame 21 and connected to the vehicle body 30.

To sum up, when the train provided according to this embodiment of this disclosure is braked, the first controller is used to control the distributor and the bidirectional DC/DC converter to feed back the braking electric energy to the traction network, and control the bidirectional DC/DC converter according to the voltage of the traction network to absorb the braking electric energy of the train by using the battery. Moreover, the battery may further discharge to the traction network according to the voltage of the traction network, thereby preventing the voltage of the traction network from being excessively low, to maintain normal operating of the traction network. In this embodiment of this disclosure, when the train is braked, the braking electric energy is first fed back to the traction network. In this case, if there are a relatively large quantity of trains on the traction network, the fed-back braking electric energy is evened to other trains, and therefore the voltage of the traction network is not increased greatly. On the contrary, if there are a relatively small quantity of trains on the traction network in this case, or a relatively large quantity of trains are braked in this case, the voltage of the traction network is increased. In this embodiment of this disclosure, the in-vehicle battery is preferentially used to absorb the braking electric energy, to avoid a problem that the braking electric energy is excessively large and cannot be rapidly absorbed or consumed and consequently an electric appliance of the traction network is burned. In this embodiment of this disclosure, the battery on the train is used to absorb the braking electric energy, thereby recovering and reusing the braking electric energy, reducing energy waste, and reducing load on the traction network. Moreover, this embodiment of this disclosure may further effectively monitor the voltage of the traction network, protect system components, and improve system safety.

Figure 17:
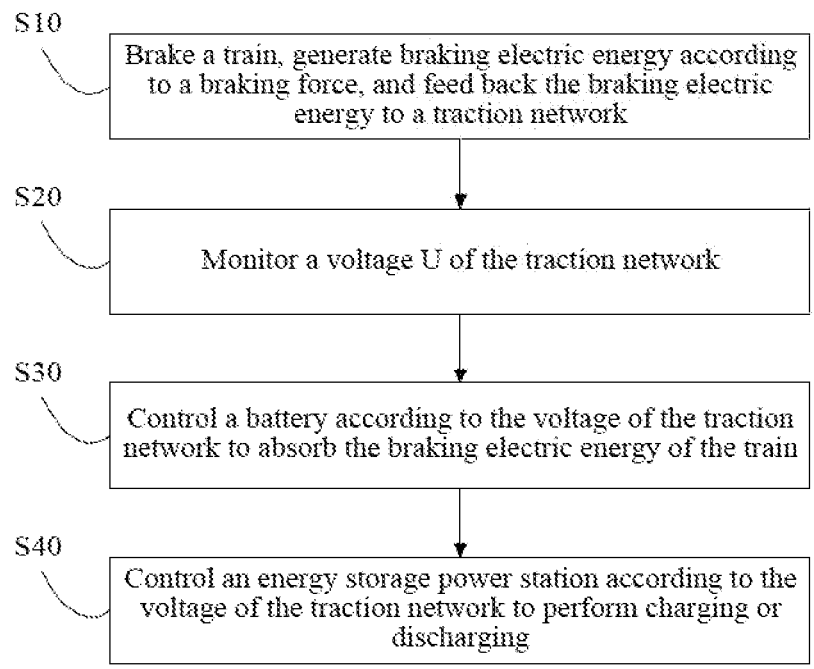
FIG. 17 is a flowchart of a braking-recovery method for a train according to an embodiment of this disclosure.

FIG. 17 is a flowchart of a braking-recovery method for a train according to an embodiment of this disclosure. As shown in FIG. 17, the braking-recovery method includes:

S10: Brake a train, generate braking electric energy according to a braking force, and feed back the braking electric energy to a traction network.

S20: Monitor a voltage of the traction network.

S30: Control a battery according to the voltage of the traction network to absorb the braking electric energy of the train.

S40: Control an energy storage power station according to the voltage of the traction network to perform charging or discharging.

Specifically, the train is braked, the braking electric energy is generated according to the braking force, and the braking electric energy is fed back to the traction network. When a quantity of trains on the traction network is relatively small, that is, load on the traction network is relatively small, or a quantity of trains braked on the traction network is relatively large, the braking electric energy fed back to the traction network exceeds electric energy needed for running the trains on the traction network, thereby increasing the voltage U of the traction network. The voltage U of the traction network is monitored in real time. When the voltage U of the traction network is increased, the battery is first controlled to absorb the braking electric energy. Moreover, the voltage of the traction network continues to be monitored. If the voltage U of the traction network continues to increase after the battery of the train is controlled to absorb the braking electric energy, the energy storage power station is controlled to absorb the braking electric energy to perform charging. Similarly, when the quantity of trains on the traction network is relatively large, that is, the load on the traction network is relatively large, the voltage U of the traction network is reduced. The voltage U of the traction network is monitored in real time. When the voltage U of the traction network is reduced, the energy storage power station is first controlled to perform discharging to increase the voltage of the traction network. If the voltage U of the traction network continues to be reduced, the battery is controlled to perform discharging to increase the voltage of the traction network.

It should be noted that, the battery is disposed on the train, and may rapidly absorb the braking electric energy, and because a distance between the energy storage power station and the train is relatively large, the energy storage power station is delayed in absorbing the braking electric energy. Therefore, in this embodiment of this disclosure, the battery is preferentially selected to absorb braking electric energy, so as to rapidly absorb the braking electric energy, thereby preventing braking electric energy that is not absorbed or consumed from increasing the voltage U of the traction network, protecting system components, preventing an electric appliance on the traction network from being damaged, and improving system safety.

According to another specific embodiment of this disclosure, if only one train on the traction network is running, that is, no other train on the traction network absorbs the braking electric energy, and the braking electric energy generated by braking the train is relatively large, the braking electric energy is mainly absorbed by the energy storage power station. For example, at first, the battery is controlled to absorb 30% of the braking electric energy, and then the energy storage power station is controlled to absorb 70% of the braking electric energy, so as to recover the braking electric energy.

According to still another specific embodiment of this disclosure, if a plurality of trains on the traction network is running, and the voltage U of the traction network still continues to increase after the energy storage power station absorbs the braking electric energy, a battery of a non-braked train may be charged by using the non-braked train on the traction network. Assuming that braking electric energy not absorbed or consumed on the traction network is Q' and there are N trains on the traction network, an average value of braking electric energy absorbed by batteries of all of the trains on the traction network is Q'/N.

Therefore, in this embodiment of this disclosure, the battery on the train is controlled to absorb the braking electric energy, thereby recovering and reusing the braking electric energy, reducing energy waste, and reducing load on the traction network. Moreover, this embodiment of this disclosure may further effectively monitor the voltage of the traction network, protect system components, and improve system safety.

According to an embodiment of this disclosure, the controlling a battery according to the voltage of the traction network to absorb the braking electric energy of the train specifically includes: judging whether the voltage of the traction network is greater than a first preset threshold such as 845 V; and controlling, if the voltage of the traction network is greater than the first preset threshold, a bidirectional DC/DC converter of the train to be enabled, and controlling the bidirectional DC/DC converter to enter a charging mode, so as to control the battery to absorb the braking electric energy. In this case, the bidirectional DC/DC converter is controlled to convert a direct current on a high-voltage side into a direct current matching a voltage of the battery, so as to charge the battery, that is, control the battery to absorb the braking electric energy. In this embodiment of this disclosure, If the bidirectional DC/DC converter is controlled to enter a discharging mode, a direct current provided by the battery is converted into a direct current matching the voltage of the traction network, so as to control the battery to perform discharging, that is, feed back the braking electric energy stored in the battery to the traction network.

According to an embodiment of this disclosure, after the battery is controlled to absorb the braking electric energy, the voltage of the traction network is decreased. The controlling a battery according to the voltage of the traction network to absorb the braking electric energy of the train further includes: judging whether the voltage of the traction network is less than a second preset threshold such as 830 V; and controlling, if the voltage of the traction network is less than the second preset threshold, the battery to stop absorbing the braking electric energy, where the second preset threshold is less than the first preset threshold.

Figure 18:
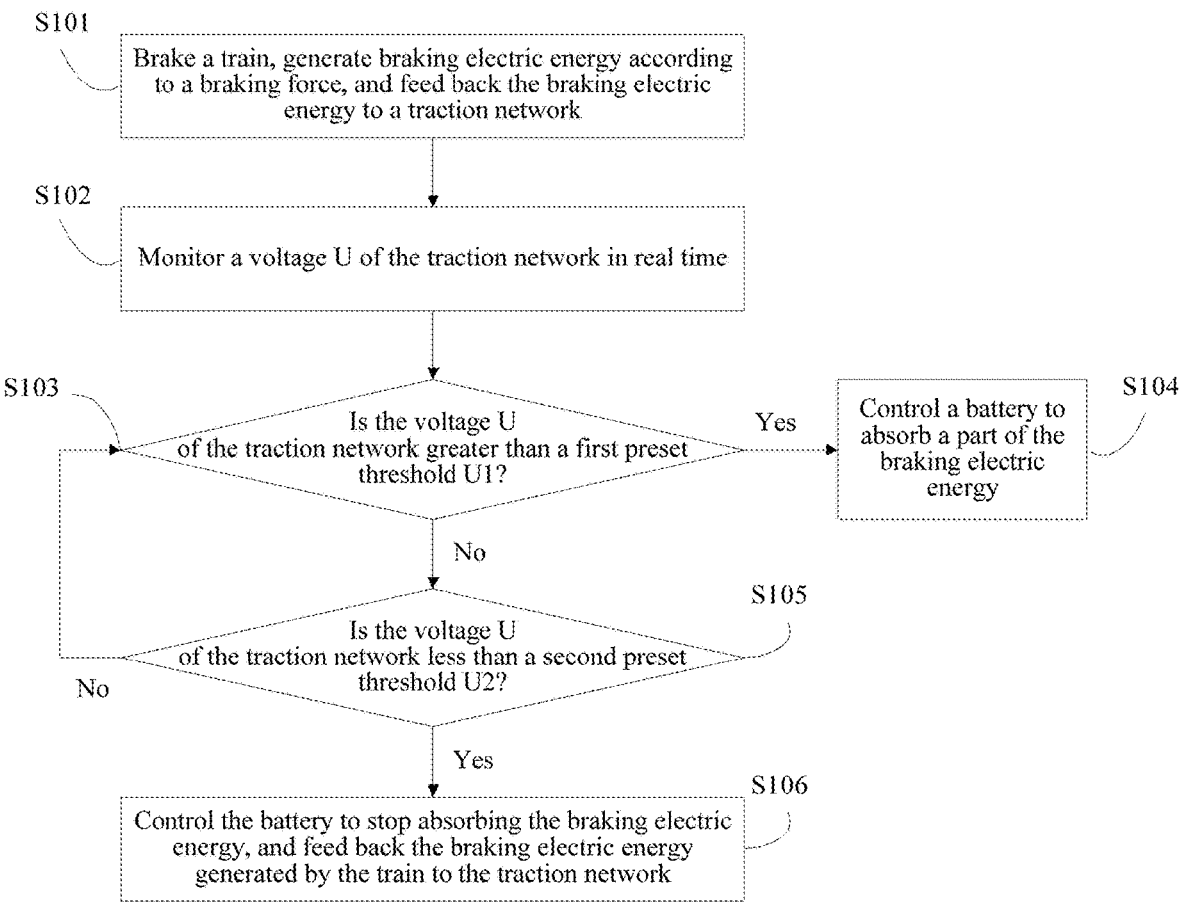
FIG. 18 is a flowchart of a braking-recovery method for a train according to an embodiment of this disclosure.

As shown in FIG. 18, the controlling a battery to absorb the braking electric energy of the train specifically includes:

S101: Brake a train, generate braking electric energy according to a braking force, and feed back the braking electric energy to a traction network.

S102: Monitor a voltage U of the traction network in real time.

S103: Judge whether the voltage U of the traction network is greater than a first preset threshold U1 such as 845 V.

If yes, indicating that the braking electric energy fed back to the traction network in this case is surplus, S104 is performed; or if not, indicating that the braking electric energy fed back to the traction network in this case and a load requirement on the traction network are basically balanced, S105 is performed.

S104: Control a battery to absorb a part of the braking electric energy.

S105: Judge whether the voltage U of the traction network is less than a second preset threshold U2 such as 830 V.

If yes, S106 is performed; or if not, S103 is performed.

S106: Control the battery to stop absorbing the braking electric energy, and feed back the braking electric energy generated by the train to the traction network.

In this embodiment of this disclosure, the battery of the train is preferentially selected to absorb the braking electric energy, so as to rapidly absorb the braking electric energy, thereby preventing the braking electric energy not consumed from increasing the voltage U of the traction network, and preventing a device on the traction network from being damaged.

According to an embodiment of this disclosure, the controlling an energy storage power station according to the voltage of the traction network to perform charging or discharging specifically includes: judging whether the voltage of the traction network is greater than a fourth preset threshold such as 855 V; and controlling, if the voltage of the traction network is greater than the fourth preset threshold, the energy storage power station to perform charging. In this embodiment of this disclosure, after the battery of the train is controlled to absorb the braking electric energy, because a quantity of trains on the traction network is relatively small in this case or a quantity of braked trains is relatively large in this case, the voltage of the traction network further continues to increase. When the voltage U of the traction network is greater than the fourth preset threshold U4, the energy storage power station is controlled to absorb electric energy from the traction network to perform charging, thereby preventing the voltage of the traction network from exceeding a maximum rated voltage.

According to an embodiment of this disclosure, the controlling an energy storage power station according to the voltage of the traction network to perform charging or discharging further includes: judging whether the voltage of the traction network is less than a fifth preset threshold such as 810 V; and controlling, if the voltage of the traction network is less than the fifth preset threshold, the energy storage power station to perform discharging, where the fifth preset threshold is less than the fourth preset threshold. In this embodiment of this disclosure, if a quantity of trains on the traction network is relatively large, the voltage of the traction network is decreased. In this case, to prevent the voltage of the traction network from being less than a lowest rated voltage, the energy storage power station needs to be controlled to discharge to the traction network. In a specific embodiment of this disclosure, there is a plurality of energy storage power stations on the traction network, and an energy storage power station whose power level is high is preferentially selected to discharge to the traction network. For example, discharging power of the energy storage power station whose power level is high is large, and discharging power of an energy storage power station whose power level is low is slightly small, thereby achieving a power level balance between the energy storage power stations.

According to an embodiment of this disclosure, the braking-recovery method for a train further includes: judging whether the voltage of the traction network is greater than a sixth preset threshold; and controlling, when the voltage of the traction network is greater than the sixth preset threshold, the energy storage power station to stop discharging, where the sixth preset threshold is greater than the fifth preset threshold.

According to an embodiment of this disclosure, the braking-recovery method for a train further includes: judging whether the voltage of the traction network is less than a seventh preset threshold; and controlling, if the voltage of the traction network is less than the seventh preset threshold, the energy storage power station to discharge to the traction network, and at the same time, controlling the battery to discharge to the traction network, where the seventh preset threshold is less than the fifth preset threshold. In this embodiment, if the voltage U of the traction network is excessively small, both the energy storage power station and the battery of the train are controlled to perform discharging, thereby rapidly increasing the voltage of the traction network.

Figure 19:
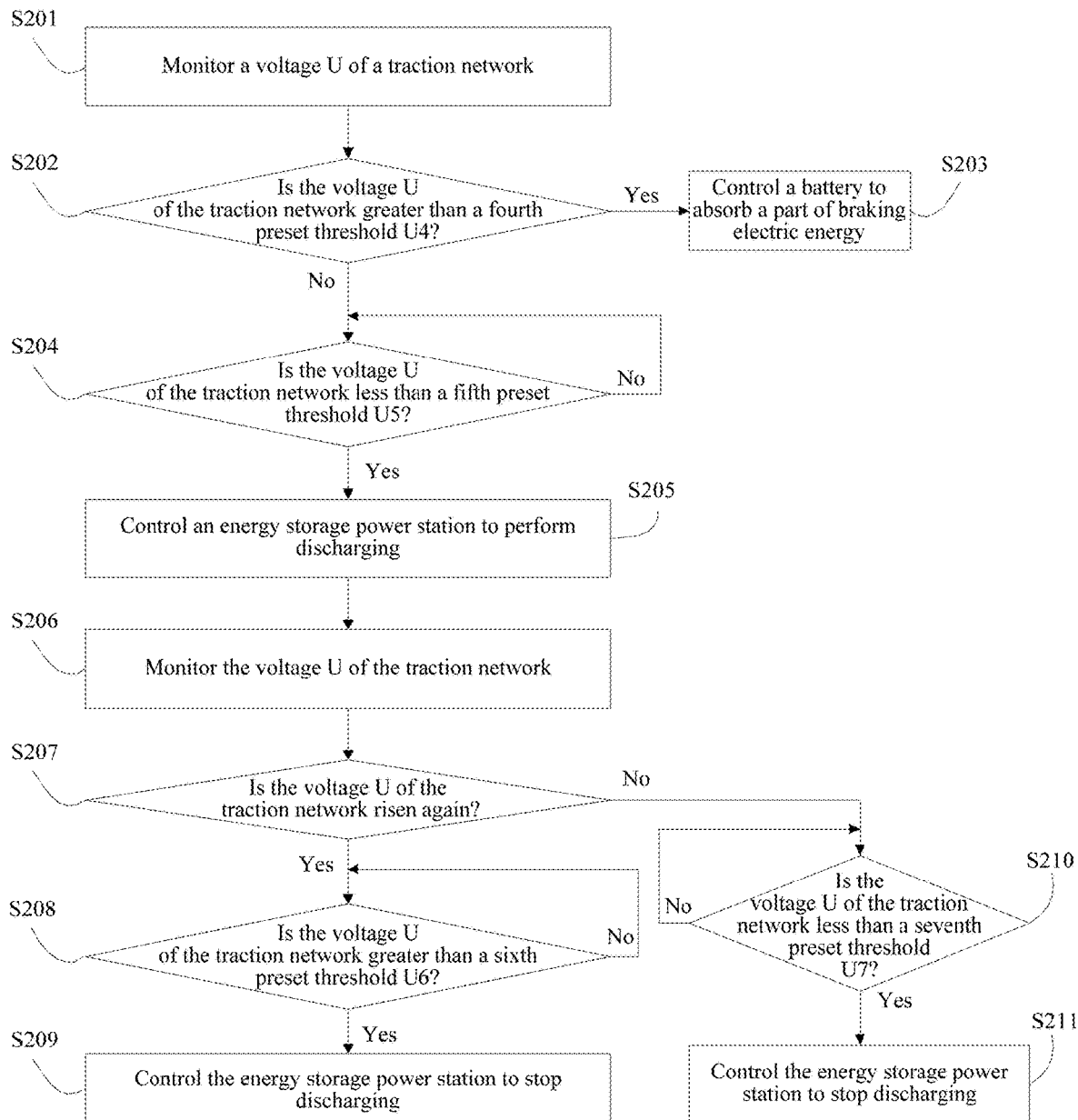
FIG. 19 is a flowchart of a braking-recovery method for a train according to another embodiment of this disclosure.

Specifically, as shown in FIG. 19, in this embodiment of this disclosure, the controlling an energy storage power station to absorb the braking electric energy of the train specifically includes:

S201: Monitor a voltage U of a traction network.

S202: Judge whether the voltage U of the traction network is greater than a fourth preset threshold U4 such as 855 V.

If yes, indicating that a large quantity of braking electric energy fed back to the traction network in this case is surplus, S203 is performed; or if not, S204 is performed.

S203: Control a battery to absorb a part of braking electric energy.

In an embodiment, absorption of the braking electric energy by using the energy storage power station may alleviate a pressure of the battery in absorbing the braking electric energy, thereby preventing the voltage U of the traction network from exceeding a maximum rated voltage Un of the traction network.

S204: Judge whether the voltage U of the traction network is less than a fifth preset threshold U5 such as 810 V.

If yes, S205 is performed; or if not, S204 is repeated.

S205: Control the energy storage power station to perform discharging.

S206: Monitor the voltage U of the traction network.

S207: Judge whether the voltage U of the traction network is risen again.

If yes, S208 is performed; or if not, S210 is performed.

S208: Judge whether the voltage U of the traction network is greater than a sixth preset threshold U6 such as 830 V.

If yes, indicating that the braking electric energy fed back to the traction network in this case and load on the traction network are basically balanced, S209 is performed; or if not, S208 is repeated.

S209: Control the energy storage power station to stop discharging.

S210: Judge whether the voltage U of the traction network is less than a seventh preset threshold U7.

If yes, S211 is performed; or if not, S210 is repeated.

S211: Control the energy storage power station to stop discharging.

According to an embodiment of this disclosure, the braking-recovery method for a train further includes: judging whether the voltage of the traction network is greater than a third preset threshold; and controlling, when the voltage of the traction network is greater than the third preset threshold, the train to be mechanically braked in cooperation with electric braking to brake the train, where the third preset threshold is greater than the first preset threshold. In this embodiment of this disclosure, if a quantity of trains on the traction network is relatively small or a quantity of braked trains is relatively large in this case, the voltage U of the traction network continues to increase after the battery and the energy storage power station absorb the braking electric energy. When the voltage of the traction network is greater than the third preset threshold U3, the train is controlled to be mechanically braked, so as to perform auxiliary braking on the train.

In an embodiment, after the battery and the energy storage power station absorb the braking electric energy, the voltage U of the traction network continues to increase. The voltage U of the traction network is monitored in real time. If the voltage U of the traction network is greater than the third preset threshold U3, the train is controlled to be mechanically braked. In this way, auxiliary braking is performed on the train through mechanical braking while the train is electrically braked, so as to reduce the braking electric energy generated by the train, thereby preventing the voltage U of the traction network from exceeding the maximum rated voltage, and precise and rapid parking may be implemented.

According to an embodiment of this disclosure, the braking-recovery method for a train further includes: detecting whether a contactor of the train is disconnected; and controlling, if it is detected that the contactor is disconnected, the battery to supply power to the train, and controlling the train to run at limited power.

In an embodiment, when it is detected that the contactor is disconnected, indicating that the train is in an abnormal power supply state, it is judged that the train enters an emergency driving mode, and an emergency traction signal is sent, so as to control the battery to perform discharging. In this case, the battery supplies power to the train. Moreover, the discharging power of the battery is controlled to be less than or equal to a preset power threshold such as 70 KW, to enable the train to run in a limited power state.

Therefore, emergency driving of the train is implemented by using the battery, to avoid a problem of difficult scheduling caused because the train is broken down midway, and also prevent the faulty train from occupying a running line.

According to an embodiment of this disclosure, the braking-recovery method for a train further includes: detecting a power level of the battery, and judging whether the power level of the battery is greater than a first power level threshold such as 80%; and controlling, if the power level of the battery is greater than the first power level threshold, the battery to stop absorbing the braking electric energy. In this embodiment of this disclosure, charging power and discharging power of the battery are limited, the power level of the battery is increased after the battery absorbs the braking electric energy. If the power level of the battery is excessively large, the service life of the battery is affected. When the power level Q is greater than the first power level threshold Q1, the battery is controlled to stop absorbing the braking electric energy.

According to an embodiment of this disclosure, the braking-recovery method for a train further includes: detecting a power level of the battery, and judging whether the power level of the battery is less than a second power level threshold such as 50%; and controlling, if the power level of the battery is less than the second power level threshold, the battery to stop discharging. In this embodiment of this disclosure, the power level of the battery is reduced after the battery discharges, and when the power level Q is less than the second power level threshold Q2, the battery is controlled to stop discharging.

Figure 20:
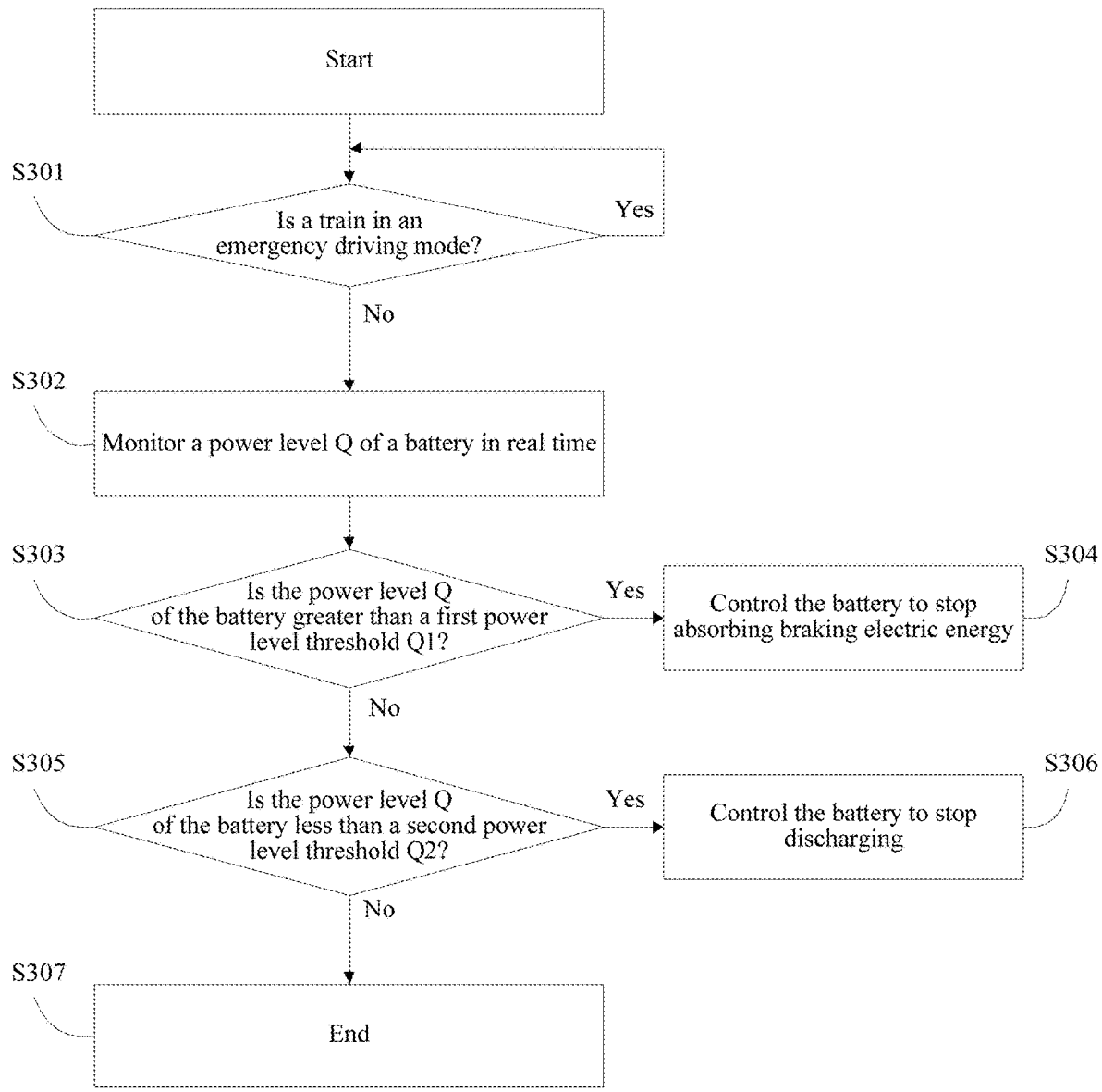
FIG. 20 is a flowchart of a method for limiting charging/discharging power of a battery of a train according to an embodiment of this disclosure.

In an embodiment, charging power and discharging power of a battery are limited by using a method shown in FIG. 20.

S301: Judge whether a train is in an emergency driving mode.

If yes, S301 is repeated; or if not, S302 is performed.

S302: Detect a power level Q of a battery in real time.

S303: Judge whether the power level Q of the battery is greater than a first power level threshold Q1 such as 80%.

If yes, S304 is performed; or if not, S305 is performed.

S304: Control the battery to stop absorbing braking electric energy. In this case, maximum allowable charging power of the battery is limited to 0.

S305: Judge whether the power level Q of the battery is less than a second power level threshold Q2 such as 50%.

If yes, S306 is performed; or if not, S307 is performed.

S306: Control the battery to stop discharging. In this case, maximum allowable discharging power of the battery is limited to 0.

S307: Complete.

It should be noted that, S303 and S304 are performed in a charging process of the battery, and S305 and S306 are performed in a discharging process of the battery.

Figure 21:
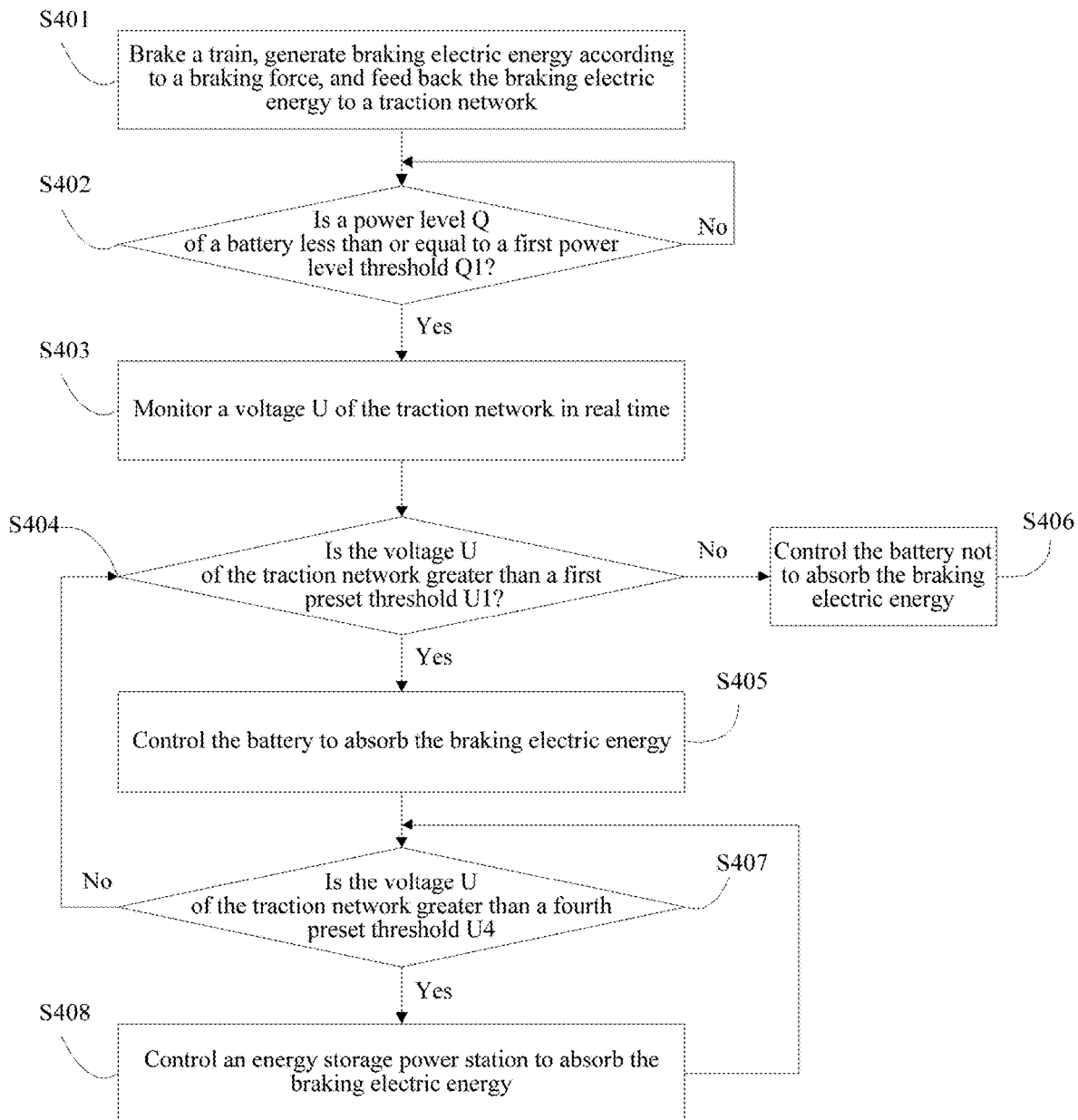
FIG. 21 is a flowchart of a braking-recovery method for a train according to a specific embodiment of this disclosure.
Figure 22:
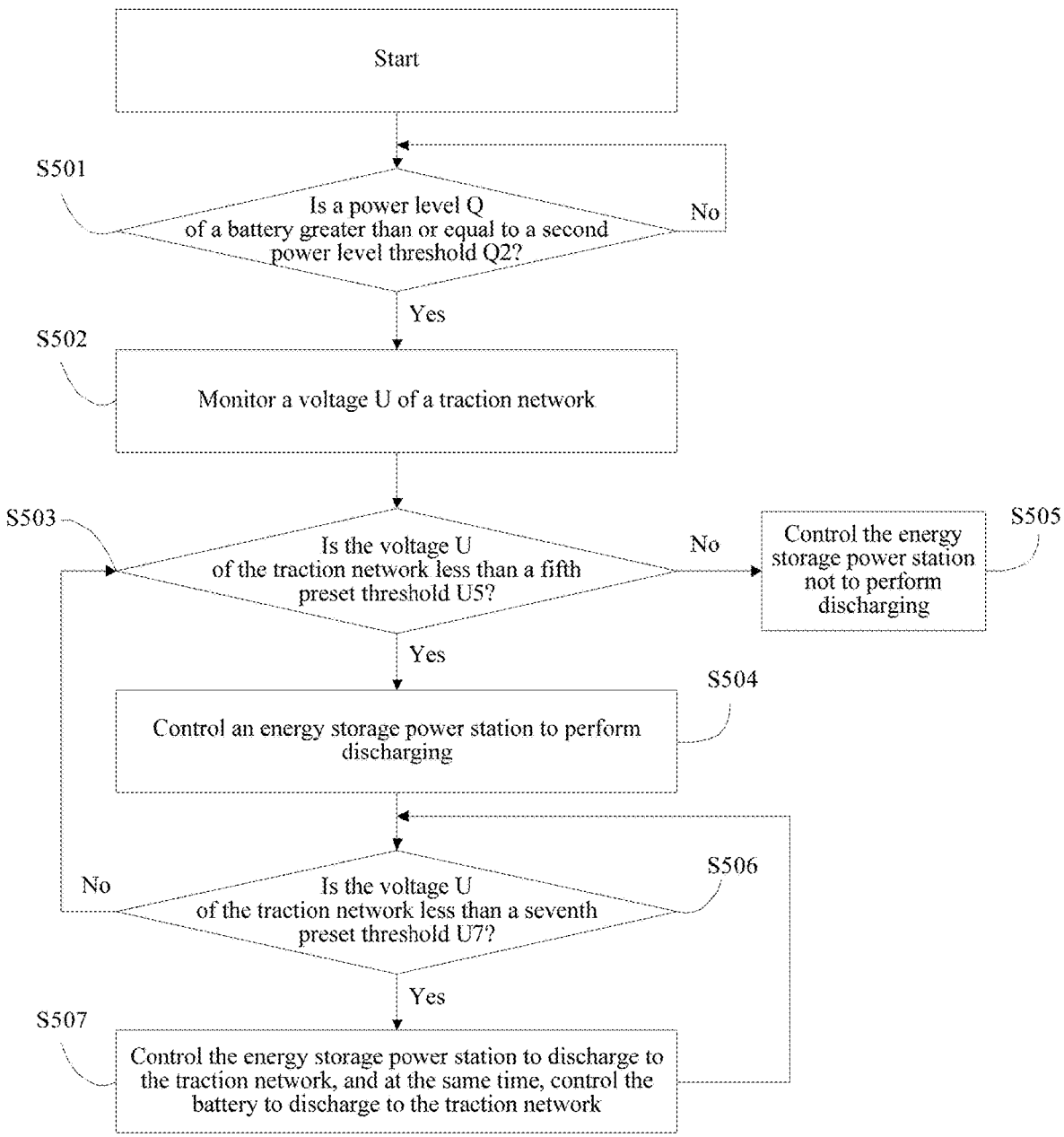
FIG. 22 is a flowchart of a braking-recovery method for a train according to another specific embodiment of this disclosure.

As described above, as shown in FIG. 21 and FIG. 22, recovery and reuse of braking electric energy in an embodiment of this disclosure is specifically as follows:

(1) Recovery of Braking Electric Energy

S401: Brake a train, generate braking electric energy according to a braking force, and feed back the braking electric energy to a traction network.

S402: Judge whether a power level Q of a battery is less than or equal to a first power level threshold Q1.

If yes, S403 is performed; or if not, S402 is repeated.

S403: Monitor a voltage U of the traction network in real time.

S404: Judge whether the voltage U of the traction network is greater than a first preset threshold U1 such as 845 V.

If yes, S405 is performed; or if not, S406 is performed.

S405: Control the battery to absorb the braking electric energy.

S406: Control the battery not to absorb the braking electric energy.

S407: Judge whether the voltage U of the traction network is greater than a fourth preset threshold U4 such as 855 V.

If yes, S408 is performed; or if not, S404 is performed.

S408: Control an energy storage power station to absorb the braking electric energy, and return to S407.

(2) Reuse of Braking Electric Energy

S501: Judge whether a power level Q of a battery is greater than or equal to a second power level threshold Q2.

If yes, S502 is performed; or if not, S501 is repeated.

S502: Monitor a voltage U of a traction network.

S503: Judge whether the voltage U of the traction network is less than a fifth preset threshold U5 such as 810 V.

If yes, S504 is performed; or if not, S505 is performed.

S504: Control an energy storage power station to perform discharging.

S505: Control the energy storage power station not to perform discharging.

S506: Judge whether the voltage U of the traction network is less than a seventh preset threshold U7.

If yes, S507 is performed; or if not, S503 is repeated.

S507: Control the energy storage power station to discharge to the traction network, and at the same time, control the battery to discharge to the traction network; and return to S506.

In addition, when the traction network has a power supply fault, the battery may be controlled to enter the discharging mode, so as to implement emergency driving of the train.

In this way, the braking electric energy absorbed by the battery and the energy storage power station may be consumed, to enable the battery and the energy storage power station to continue to recover the braking electric energy, thereby saving the operating costs.

To sum up, according to the braking-recovery method for a train provided in this embodiment of this disclosure, at first, the train is braked, the braking electric energy is generated according to the braking force, and the braking electric energy is fed back to the traction network; then the voltage of the traction network is monitored, and the battery is controlled according to the voltage of the traction network to absorb the braking electric energy of the train; the voltage of the traction network continues to be monitored, and whether the voltage of the traction network continues to increase is judged; and if it is judged that the voltage of the traction network continues to increase, the energy storage power station is controlled to absorb the braking electric energy. Moreover, the energy storage power station may be further controlled according to the voltage of the traction network to perform discharging, thereby preventing the voltage of the traction network from being excessively low, to maintain normal operating of the traction network. In this embodiment of this disclosure, after the train is braked, the braking electric energy is first fed back to the traction network, and a quantity of trains on the traction network is judged. In this case, if there are a relatively large quantity of trains on the traction network, the fed-back braking electric energy is evened to other trains, and therefore the voltage of the traction network is not increased greatly. On the contrary, if there are a relatively small quantity of trains on the traction network or a relatively large quantity of trains are braked in this case, the voltage of the traction network is rapidly increased. In this embodiment of this disclosure, the in-vehicle battery is preferentially controlled to absorb the braking electric energy, and if the voltage of the traction network continues to increase after the in-vehicle battery absorbs the braking electric energy, the energy storage power station is controlled to absorb the braking electric energy. Because the in-vehicle battery is mounted onto the train, the battery is preferentially controlled to absorb the braking electric energy, to avoid a problem that the braking electric energy is excessively large and cannot be rapidly absorbed or consumed and consequently an electric appliance of the traction network is burned. In this embodiment of this disclosure, the battery on the train and the energy storage power station are controlled to absorb the braking electric energy, thereby recovering and reusing the braking electric energy, reducing energy waste, and reducing load on the traction network. Moreover, this embodiment of this disclosure may further effectively monitor the voltage of the traction network, protect system components, and improve system safety.

In the description of this disclosure, it should be understood that, orientations or position relationships indicated by terms such as "center", "longitudinal", "transverse", "length", "width", "thickness", "up", "down", "front", "back", "left", "right", "vertical", "horizontal", "top", "bottom", "inner", "outer", "clockwise", "counterclockwise", "axial", "radial", and "circumferential" are orientations or position relationship shown based on the accompanying drawings, and are merely used for describing this disclosure and simplifying the description, rather than indicating or implying that the apparatus or element should have a particular orientation or be constructed and operated in a particular orientation, and therefore, should not be construed as a limitation on this disclosure.

In addition, terms "first" and "second" are used only for description objectives, and shall not be construed as indicating or implying relative importance or implying a quantity of indicated technical features. Therefore, a feature restricted by "first" or "second" may explicitly indicate or implicitly include at least one such feature. In the description of this disclosure, unless otherwise specifically limited, "multiple" means at least two, for example, two or three.

In this disclosure, unless explicitly specified or limited otherwise, the terms "mounted", "connected", "connection", and "fixed" should be understood broadly, for example, which may be fixed connections, detachable connections or integral connections; may be mechanical connections or electrical connections; may be direct connections, indirectly connected with each other through an intermediate medium, or communications inside two elements or an interaction relationship of two elements, unless otherwise specifically limited. Those of ordinary skill in the art can understand specific meanings of the terms in this disclosure according to specific situations.

In this disclosure, unless explicitly specified or limited otherwise, a first characteristic "on" or "under" a second characteristic may be the first characteristic in direct contact with the second characteristic, or the first characteristic in indirect contact with the second characteristic by using an intermediate medium. Moreover, the first characteristic "on", "above" and "over" the second characteristic may be the first characteristic right above or obliquely above the second characteristic, or only indicates that a horizontal height of the first characteristic is greater than that of the second characteristic. The first characteristic "under", "below" and "beneath" the second characteristic may be the first characteristic right below or obliquely below the second characteristic, or only indicates that a horizontal height of the first characteristic is less than that of the second characteristic.

In the descriptions of this specification, descriptions such as reference terms "an embodiment", "some embodiments", "example", "specific example", or "some examples" intend to indicate that specific features, structures, materials, or characteristics described with reference to embodiments or examples are included in at least one embodiment or example of this disclosure. In this specification, exemplary descriptions of the foregoing terms do not necessarily refer to a same embodiment or example. In addition, the described specific feature, structure, material, or characteristic may be combined in a proper manner in any one or more embodiments or examples. In addition, with no conflict, a person skilled in the art can integrate and combine different embodiments or examples and features of the different embodiments and examples described in this specification.

Although the embodiments of this disclosure are shown and described above, it can be understood that the foregoing embodiments are exemplary, and should not be construed as limitations to this disclosure. A person of ordinary skill in the art can make changes, modifications, replacements, and variations to the foregoing embodiments within the scope of this disclosure.

What is claimed is:

1. A braking-recovery system for a train, comprising:
   a traction network;
   a train, wherein the train comprises:
     an electric brake;
     a battery;
     a distributor, wherein the distributor is connected to the electric brake, and there is a node between the distributor and the electric brake;
     a bidirectional DC/DC converter, wherein one end of the bidirectional DC/DC converter is connected to the battery, and another end of the bidirectional DC/DC converter is connected to the node; and
     a first controller, wherein the first controller is connected to the distributor and the bidirectional DC/DC converter, and the first controller is used to control, when the train is braked, the distributor and the bidirectional DC/DC converter to feed back braking electric energy of the train to the traction network, and control the bidirectional DC/DC converter according to a voltage of the traction network to absorb the braking electric energy of the train by using the battery; and
   an energy storage power station, wherein the energy storage power station is connected to the traction network, the energy storage power station comprises a second controller, and the second controller is used to control the energy storage power station according to the voltage of the traction network to perform charging or discharging.

2. The braking-recovery system for a train according to claim 1, wherein the first controller is used to control, when the voltage of the traction network is greater than a first preset threshold, the bidirectional DC/DC converter to enter a charging mode to enable the battery to absorb the braking electric energy.

3. The braking-recovery system for a train according to claim 1, wherein
   the first controller is used to control, when the voltage of the traction network is less than a second preset threshold, the bidirectional DC/DC converter to be disabled to enable the battery to stop absorbing the braking electric energy, wherein the second preset threshold is less than the first preset threshold.

4. The braking-recovery system for a train according to claim 1, wherein the train further comprises:
   a power level detector, wherein the power level detector is connected to the first controller, and the power level detector is used to detect a power level of the battery, wherein when the battery absorbs the braking electric energy, the first controller is further used to control, when the power level of the battery is greater than a first power level threshold, the bidirectional DC/DC converter to be disabled to enable the battery to stop absorbing the braking electric energy.

5. The braking-recovery system for a train according to claim 1, wherein the train further comprises:
   a mechanical brake, used to mechanically brake the train.

6. The braking-recovery system for a train according to claim 5, wherein
   after the battery absorbs the braking electric energy, the first controller is further used to control, when the voltage of the traction network is greater than a third preset threshold, the mechanical brake to be started to brake the train in cooperation with the electric brake, wherein the third preset threshold is greater than the first preset threshold.

7. The braking-recovery system for a train according to claim 1, wherein
the second controller is used to control, when the voltage of the traction network is greater than a fourth preset threshold, the energy storage power station to perform charging.

8. The braking-recovery system for a train according to claim 7, wherein
the second controller is used to control, when the voltage of the traction network is less than a fifth preset threshold, the energy storage power station to perform discharging, wherein the fifth preset threshold is less than the fourth preset threshold.

9. The braking-recovery system for a train according to claim 8, wherein after the energy storage power station discharges to the traction network, the second controller is further used to control, when the voltage of the traction network is greater than a sixth preset threshold, the energy storage power station to stop discharging, wherein the sixth preset threshold is greater than the fifth preset threshold.

10. The braking-recovery system for a train according to claim 8, wherein
when the voltage of the traction network is less than a seventh preset threshold, the second controller controls the energy storage power station to discharge to the traction network, and at the same time, the first controller controls the bidirectional DC/DC converter to enter a discharging mode to enable the battery of the train to discharge to the traction network, wherein the seventh preset threshold is less than the fifth preset threshold.

11. The braking-recovery system for a train according to claim 10, wherein when the battery discharges to the traction network, the first controller is further used to control, when the power level of the battery is less than a second power level threshold, the bidirectional DC/DC converter to be disabled to enable the battery to stop discharging.

12. The braking-recovery system for a train according to claim 1, wherein the train further comprises:
a contactor detector, wherein the contactor detector is connected to the first controller, and the contactor detector is used to detect whether a contactor of the train is disconnected, wherein the first controller is further used to: after the contactor is disconnected, control the distributor to be disabled, control the bidirectional DC/DC converter to enter the discharging mode to enable the battery to supply power to the train, and control the train to run at limited power.

13. The braking-recovery system for a train according to claim 1, wherein there is a plurality of energy storage power stations, and the plurality of energy storage power stations is spaced apart according to a preset distance.

14. A train, comprising:
an electric brake;
a battery;
a distributor, wherein the distributor is connected to the electric brake, and there is a node between the distributor and the electric brake;
a bidirectional DC/DC converter, wherein one end of the bidirectional DC/DC converter is connected to the battery, and another end of the bidirectional DC/DC converter is connected to the node; and
a first controller, wherein the first controller is connected to the distributor and the bidirectional DC/DC converter, and the first controller is used to control, when the train is braked, the distributor and the bidirectional DC/DC converter to feed back braking electric energy of the train to the traction network, and control the bidirectional DC/DC converter according to a voltage of the traction network to absorb the braking electric energy of the train by using the battery.

15. The train according to claim 14, wherein
the first controller is used to control, when the voltage of the traction network is greater than a first preset threshold, the bidirectional DC/DC converter to enter a charging mode to enable the battery to absorb the braking electric energy.

16. The train according to claim 14, wherein the first controller is used to:
control, when the voltage of the traction network is less than a second preset threshold, the bidirectional DC/DC converter to be disabled to enable the battery to stop absorbing the braking electric energy, wherein the second preset threshold is less than the first preset threshold.

17. The train according to claim 16, further comprising:
a power level detector, wherein the power level detector is connected to the first controller, and the power level detector is used to detect a power level of the battery, wherein when the battery absorbs the braking electric energy, the first controller is further used to control, when the power level of the battery is greater than a first power level threshold, the bidirectional DC/DC converter to be disabled to enable the battery to stop absorbing the braking electric energy.

18. The train according to claim 14, wherein the first controller is further used to:
when the battery discharges to the traction network, control, when the power level of the battery is less than a second power level threshold, the bidirectional DC/DC converter to be disabled to enable the battery to stop discharging.

19. A braking-recovery method for a train, comprising:
braking the train, generating braking electric energy according to a braking force, and feeding back the braking electric energy to a traction network;
monitoring a voltage of the traction network;
controlling a battery according to the voltage of the traction network to absorb the braking electric energy of the train; and
controlling an energy storage power station according to the voltage of the traction network to perform charging or discharging.

20. The braking-recovery method for a train according to claim 19, wherein the controlling a battery according to the voltage of the traction network to absorb the braking electric energy of the train specifically comprises:
judging whether the voltage of the traction network is greater than a first preset threshold; and
controlling, if the voltage of the traction network is greater than the first preset threshold, the battery to absorb the braking electric energy.

* * * * *